(12) United States Patent
Mesaros

(10) Patent No.: US 8,438,075 B2
(45) Date of Patent: May 7, 2013

(54) METHOD AND COMPUTER MEDIUM FOR FACILITATING A BUYER-INITIATED FEATURE WITHIN A BUSINESS TRANSACTION

(75) Inventor: Gregory J. Mesaros, Westlake, OH (US)

(73) Assignee: eWinWin, Inc., Tampa, FL (US)

( * ) Notice: Subject to any disclaimer, the term of this patent is extended or adjusted under 35 U.S.C. 154(b) by 0 days.

(21) Appl. No.: 13/492,659

(22) Filed: Jun. 8, 2012

(65) Prior Publication Data

US 2012/0284110 A1    Nov. 8, 2012

Related U.S. Application Data

(63) Continuation of application No. 12/704,280, filed on Feb. 11, 2010, now Pat. No. 8,219,460, which is a continuation of application No. 10/650,635, filed on Aug. 28, 2003, now Pat. No. 7,689,463.

(60) Provisional application No. 60/406,475, filed on Aug. 28, 2002.

(51) Int. Cl.
*G06Q 30/00* (2006.01)

(52) U.S. Cl.
USPC ......... 705/26.41; 705/26.4; 705/26.8; 705/80

(58) Field of Classification Search ........ 705/26.1–27.2, 705/80
See application file for complete search history.

(56) References Cited

U.S. PATENT DOCUMENTS

| | | | |
|---|---|---|---|
| 4,789,928 A | 12/1988 | Fujisaki | |
| 4,799,156 A | 1/1989 | Shavit et al. | |
| 4,887,207 A | 12/1989 | Natarajan | |
| 4,947,028 A | 8/1990 | Gorog | |
| 4,992,940 A | 2/1991 | Dworkin | |
| 5,053,956 A | 10/1991 | Donald et al. | |
| 5,053,957 A | 10/1991 | Suzuki | |
| 5,063,506 A | 11/1991 | Brockwell et al. | |
| 5,402,336 A | 3/1995 | Spiegelhoff et al. | |
| 5,414,838 A | 5/1995 | Kolton et al. | |

(Continued)

FOREIGN PATENT DOCUMENTS

| | | |
|---|---|---|
| JP | 11-184910 | 7/1999 |
| WO | WO 98/21713 | 4/1998 |

(Continued)

OTHER PUBLICATIONS

U.S. Appl. No. 13/269,360 Final Office Action mailed Jul. 6, 2012.

(Continued)

*Primary Examiner* — William Allen
(74) *Attorney, Agent, or Firm* — Lewis and Roca LLP

(57) ABSTRACT

A system and method for conducting electronic business between buyers and sellers is provided. The system and method disclose a means for at least one buyer to request and receive online bids from one or more sellers of a particular product according to a price curve or price schedule. A price schedule or curve for a product defining a product's unit price as a function of the volume of product ordered. Upon receipt of a plurality of bids from sellers, a buyer can then select a seller-supplier based at least in part on the price schedule.

32 Claims, 20 Drawing Sheets

U.S. PATENT DOCUMENTS

| | | |
|---|---|---|
| 5,444,630 A | 8/1995 | Dlugos |
| 5,564,115 A | 10/1996 | Clarkson |
| 5,592,375 A | 1/1997 | Salmon et al. |
| 5,615,109 A | 3/1997 | Eder |
| 5,623,660 A | 4/1997 | Josephson |
| 5,664,115 A | 9/1997 | Fraser |
| 5,689,652 A | 11/1997 | Lupien et al. |
| 5,710,887 A | 1/1998 | Chelliah et al. |
| 5,717,989 A | 2/1998 | Tozzoli et al. |
| 5,732,400 A | 3/1998 | Mandler et al. |
| 5,734,890 A | 3/1998 | Case et al. |
| 5,794,207 A | 8/1998 | Walker et al. |
| 5,797,127 A | 8/1998 | Walker et al. |
| 5,822,736 A | 10/1998 | Hartman et al. |
| 5,826,244 A | 10/1998 | Huberman |
| 5,835,896 A | 11/1998 | Fisher et al. |
| 5,837,071 A | 11/1998 | Andersson et al. |
| 5,842,178 A | 11/1998 | Giovannoli |
| 5,845,265 A | 12/1998 | Woolston |
| 5,850,442 A | 12/1998 | Muftic |
| 5,870,721 A | 2/1999 | Norris |
| 5,878,400 A | 3/1999 | Carter, III |
| 5,884,271 A | 3/1999 | Pitroda |
| 5,890,138 A | 3/1999 | Godin et al. |
| 5,897,620 A | 4/1999 | Walker et al. |
| 5,903,830 A | 5/1999 | Joao et al. |
| 5,923,741 A | 7/1999 | Wright et al. |
| 5,933,817 A | 8/1999 | Hucal |
| 5,940,807 A | 8/1999 | Purcell |
| 5,945,653 A | 8/1999 | Walker et al. |
| 5,950,172 A | 9/1999 | Klingman |
| 5,960,411 A | 9/1999 | Hartman et al. |
| 5,966,697 A | 10/1999 | Fergerson et al. |
| 5,970,478 A | 10/1999 | Walker et al. |
| 5,974,396 A | 10/1999 | Anderson et al. |
| 5,974,406 A | 10/1999 | Bisdikian et al. |
| 5,987,434 A | 11/1999 | Libman |
| 5,995,943 A | 11/1999 | Bull et al. |
| 5,999,915 A | 12/1999 | Nahan et al. |
| 6,014,638 A | 1/2000 | Burge et al. |
| 6,016,484 A | 1/2000 | Williams et al. |
| 6,026,383 A | 2/2000 | Ausubel |
| 6,032,136 A | 2/2000 | Brake et al. |
| 6,035,289 A | 3/2000 | Chou et al. |
| 6,052,670 A | 4/2000 | Johnson |
| 6,055,519 A | 4/2000 | Kennedy et al. |
| 6,055,573 A | 4/2000 | Gardenswartz et al. |
| 6,064,981 A | 5/2000 | Barni et al. |
| 6,078,906 A | 6/2000 | Huberman |
| 6,101,484 A | 8/2000 | Halbert et al. |
| 6,108,632 A | 8/2000 | Reeder et al. |
| 6,108,639 A | 8/2000 | Walker et al. |
| 6,112,185 A | 8/2000 | Walker et al. |
| 6,112,189 A | 8/2000 | Richard et al. |
| 6,131,087 A | 10/2000 | Luke et al. |
| 6,141,653 A | 10/2000 | Conklin et al. |
| 6,151,588 A | 11/2000 | Tozzoli et al. |
| 6,154,738 A | 11/2000 | Call |
| 6,167,383 A | 12/2000 | Henson |
| 6,195,646 B1 | 2/2001 | Grosh et al. |
| 6,219,653 B1 | 4/2001 | O'Neill et al. |
| 6,233,566 B1 | 5/2001 | Levine et al. |
| 6,236,972 B1 | 5/2001 | Shkedy |
| 6,236,977 B1 | 5/2001 | Verba et al. |
| 6,236,978 B1 | 5/2001 | Tuzhilin |
| 6,249,772 B1 | 6/2001 | Walker et al. |
| 6,253,189 B1 | 6/2001 | Feezell et al. |
| 6,260,019 B1 | 7/2001 | Courts |
| 6,260,024 B1 | 7/2001 | Shkedy |
| 6,266,651 B1 | 7/2001 | Woolston |
| 6,269,343 B1 | 7/2001 | Pallakoff |
| 6,289,348 B1 | 9/2001 | Richard et al. |
| 6,323,894 B1 | 11/2001 | Katz |
| 6,327,574 B1 | 12/2001 | Kramer et al. |
| 6,332,127 B1 | 12/2001 | Bandera et al. |
| 6,332,135 B1 | 12/2001 | Conklin et al. |
| 6,336,105 B1 | 1/2002 | Conklin et al. |
| 6,338,050 B1 | 1/2002 | Conklin et al. |
| 6,360,205 B1 | 3/2002 | Iyengar et al. |
| 6,397,208 B1 | 5/2002 | Lee |
| 6,415,270 B1 | 7/2002 | Rackson et al. |
| 6,418,415 B1 | 7/2002 | Walker et al. |
| 6,418,441 B1 | 7/2002 | Call |
| 6,449,601 B1 | 9/2002 | Friedland et al. |
| 6,450,407 B1 | 9/2002 | Freeman et al. |
| 6,456,986 B1 | 9/2002 | Boardman et al. |
| 6,466,919 B1 | 10/2002 | Walker et al. |
| 6,496,568 B1 | 12/2002 | Nelson |
| 6,505,046 B1 | 1/2003 | Baker |
| 6,507,279 B2 | 1/2003 | Loof |
| 6,519,571 B1 | 2/2003 | Guheen et al. |
| 6,553,346 B1 | 4/2003 | Walker et al. |
| 6,553,350 B2 | 4/2003 | Carter |
| 6,560,501 B1 | 5/2003 | Walser et al. |
| 6,578,014 B1 | 6/2003 | Murcko, Jr. |
| 6,584,451 B1 | 6/2003 | Shoham et al. |
| 6,587,835 B1 | 7/2003 | Treyz et al. |
| 6,598,026 B1 | 7/2003 | Ojha et al. |
| 6,601,043 B1 | 7/2003 | Purcell |
| 6,604,089 B1 | 8/2003 | Van Horn et al. |
| 6,606,603 B1 | 8/2003 | Joseph et al. |
| 6,606,607 B1 | 8/2003 | Martin et al. |
| 6,607,136 B1 | 8/2003 | Atsmon et al. |
| 6,631,356 B1 | 10/2003 | Van Horn et al. |
| 6,647,257 B2 | 11/2003 | Owensby |
| 6,647,373 B1 | 11/2003 | Carlton-Foss |
| 6,658,093 B1 | 12/2003 | Langseth et al. |
| 6,662,194 B1 | 12/2003 | Joao et al. |
| 6,705,520 B1 | 3/2004 | Pitroda et al. |
| 6,716,101 B1 | 4/2004 | Meadows et al. |
| 6,754,636 B1 | 6/2004 | Walker et al. |
| 6,769,607 B1 | 8/2004 | Pitroda et al. |
| 6,778,968 B1 | 8/2004 | Gulati |
| 6,782,370 B1 | 8/2004 | Stack |
| 6,785,661 B1 | 8/2004 | Mandler et al. |
| 6,847,938 B1 | 1/2005 | Moore |
| 6,847,965 B2 | 1/2005 | Walker et al. |
| 6,850,907 B2 | 2/2005 | Lutnick et al. |
| 6,868,392 B1 | 3/2005 | Ogasawara |
| 6,871,140 B1 | 3/2005 | Florance et al. |
| 6,871,190 B1 | 3/2005 | Seymour et al. |
| 6,876,977 B1 | 4/2005 | Marks |
| 6,876,982 B1 | 4/2005 | Lancaster |
| 6,876,983 B1 | 4/2005 | Goddard |
| 6,877,655 B1 | 4/2005 | Robertson et al. |
| 6,877,665 B2 | 4/2005 | Gobburu et al. |
| 6,915,275 B2 | 7/2005 | Banerjee et al. |
| 6,925,446 B2 | 8/2005 | Watanabe |
| 6,928,416 B1 | 8/2005 | Bertash |
| 6,934,690 B1 | 8/2005 | Van Horn et al. |
| 6,954,734 B1 | 10/2005 | Kuelbs et al. |
| 6,990,467 B1 | 1/2006 | Kwan |
| 6,992,794 B2 | 1/2006 | Keane et al. |
| 7,013,286 B1 | 3/2006 | Aggarwal et al. |
| 7,039,603 B2 | 5/2006 | Walker et al. |
| 7,047,206 B1 | 5/2006 | Schultze |
| 7,062,452 B1 | 6/2006 | Lotvin et al. |
| 7,065,494 B1 | 6/2006 | Evans |
| 7,069,228 B1 | 6/2006 | Rose et al. |
| 7,072,849 B1 | 7/2006 | Filepp et al. |
| 7,072,853 B2 | 7/2006 | Shkedi |
| 7,076,447 B1 | 7/2006 | Peyser et al. |
| 7,080,030 B2 | 7/2006 | Eglen et al. |
| 7,082,408 B1 * | 7/2006 | Baumann et al. .......... 705/26.8 |
| 7,103,565 B1 | 9/2006 | Vaid |
| 7,107,225 B1 | 9/2006 | McClung, III |
| 7,107,226 B1 | 9/2006 | Cassidy et al. |
| 7,120,592 B1 | 10/2006 | Lewis |
| 7,124,099 B2 | 10/2006 | Mesaros |
| 7,124,107 B1 | 10/2006 | Pishevar et al. |
| 7,133,835 B1 | 11/2006 | Fusz et al. |
| 7,143,057 B2 | 11/2006 | Kuelbs et al. |
| 7,146,330 B1 | 12/2006 | Aion et al. |
| 7,165,045 B1 | 1/2007 | Kim-E |
| 7,181,419 B1 | 2/2007 | Mesaros |
| 7,194,427 B1 | 3/2007 | Van Horn et al. |
| 7,194,442 B1 | 3/2007 | Flanagan et al. |

| Patent | Kind | Date | Inventor | Class |
|---|---|---|---|---|
| 7,213,754 | B2 | 5/2007 | Eglen et al. | |
| 7,240,021 | B1 | 7/2007 | Walker et al. | |
| 7,243,082 | B1 | 7/2007 | Forlai | |
| 7,254,833 | B1 | 8/2007 | Cornelius et al. | |
| 7,263,498 | B1 | 8/2007 | Van Horn et al. | |
| 7,263,505 | B1 | 8/2007 | Forlai | |
| 7,296,001 | B1 | 11/2007 | Ephrati et al. | |
| 7,330,826 | B1 | 2/2008 | Porat et al. | |
| 7,343,317 | B2 | 3/2008 | Jokinen et al. | |
| 7,349,890 | B1 | 3/2008 | Pathak et al. | |
| 7,363,246 | B1 | 4/2008 | Van Horn et al. | |
| 7,364,086 | B2 | 4/2008 | Mesaros | |
| 7,376,613 | B1* | 5/2008 | Cofino et al. | 705/37 |
| 7,379,899 | B1 | 5/2008 | Junger | |
| 7,415,428 | B2 | 8/2008 | Garwood | |
| 7,415,617 | B2 | 8/2008 | Ginter et al. | |
| 7,433,832 | B1 | 10/2008 | Bezos et al. | |
| 7,464,051 | B1 | 12/2008 | Heggem | |
| 7,475,024 | B1 | 1/2009 | Phan | |
| 7,480,627 | B1 | 1/2009 | Van Horn et al. | |
| 7,496,543 | B1 | 2/2009 | Bamford et al. | |
| 7,523,045 | B1 | 4/2009 | Walker et al. | |
| 7,539,742 | B2 | 5/2009 | Spector | |
| 7,542,927 | B2 | 6/2009 | Mukai | |
| 7,552,069 | B2 | 6/2009 | Kepecs | |
| 7,577,582 | B1* | 8/2009 | Ojha et al. | 705/26.3 |
| 7,584,146 | B1 | 9/2009 | Duhon | |
| 7,593,871 | B1 | 9/2009 | Mesaros | |
| 7,596,509 | B1 | 9/2009 | Bryson | |
| 7,599,857 | B2 | 10/2009 | Bishop et al. | |
| 7,606,731 | B2 | 10/2009 | McClung, III | |
| 7,624,044 | B2 | 11/2009 | Wren | |
| 7,630,919 | B1 | 12/2009 | Obrecht | |
| 7,636,672 | B2 | 12/2009 | Angles et al. | |
| 7,672,870 | B2 | 3/2010 | Haines et al. | |
| 7,680,696 | B1 | 3/2010 | Murray | |
| 7,689,463 | B1 | 3/2010 | Mesaros | |
| 7,689,468 | B2 | 3/2010 | Walker et al. | |
| 7,689,469 | B1 | 3/2010 | Mesaros | |
| 7,693,748 | B1 | 4/2010 | Mesaros | |
| 7,698,173 | B1 | 4/2010 | Burge et al. | |
| 7,698,208 | B2 | 4/2010 | Hirani et al. | |
| 7,698,240 | B1 | 4/2010 | Chatterjee et al. | |
| 7,706,838 | B2 | 4/2010 | Atsmon et al. | |
| 7,725,350 | B2 | 5/2010 | Schlee | |
| 7,729,977 | B2 | 6/2010 | Xiao et al. | |
| 7,747,473 | B1 | 6/2010 | Mesaros | |
| 7,792,699 | B2 | 9/2010 | Kwei | |
| 7,801,803 | B2 | 9/2010 | Forlai | |
| 7,813,955 | B2 | 10/2010 | Ariff et al. | |
| 7,814,106 | B2 | 10/2010 | Guido et al. | |
| 7,814,114 | B2 | 10/2010 | Mi et al. | |
| 7,815,114 | B2 | 10/2010 | Mesaros | |
| 7,818,212 | B1 | 10/2010 | Mesaros | |
| 7,860,776 | B1 | 12/2010 | Chin et al. | |
| 7,890,373 | B2 | 2/2011 | Junger | |
| 7,899,707 | B1 | 3/2011 | Mesaros | |
| 7,912,761 | B2 | 3/2011 | Vaid | |
| 7,917,386 | B2 | 3/2011 | Christensen | |
| 7,917,416 | B2 | 3/2011 | Quinn et al. | |
| 7,937,288 | B2 | 5/2011 | Blaser et al. | |
| 7,942,316 | B2 | 5/2011 | Bennett et al. | |
| 7,958,007 | B2 | 6/2011 | Urbanski et al. | |
| 8,005,747 | B2 | 8/2011 | Forlai | |
| 8,015,583 | B2 | 9/2011 | Bates et al. | |
| 8,024,226 | B2 | 9/2011 | Fusz et al. | |
| 8,032,409 | B1 | 10/2011 | Mikurak | |
| 8,032,422 | B2 | 10/2011 | Pickard et al. | |
| 8,036,941 | B2 | 10/2011 | Bennett et al. | |
| 8,073,762 | B2 | 12/2011 | Sheth et al. | |
| 8,140,402 | B1 | 3/2012 | Mesaros | |
| 8,140,405 | B2 | 3/2012 | Mesaros | |
| 8,140,442 | B2 | 3/2012 | Heyer | |
| 8,140,615 | B2 | 3/2012 | Miller et al. | |
| 8,160,931 | B2 | 4/2012 | Mesaros | |
| 8,196,811 | B2 | 6/2012 | Mesaros | |
| 8,219,460 | B1 | 7/2012 | Mesaros | |
| 8,249,942 | B2 | 8/2012 | Mesaros | |
| 8,271,332 | B2 | 9/2012 | Mesaros | |
| 8,285,598 | B2 | 10/2012 | Mesaros | |
| 2001/0011264 | A1 | 8/2001 | Kawasaki | |
| 2001/0014868 | A1 | 8/2001 | Herz et al. | |
| 2001/0018660 | A1 | 8/2001 | Sehr | |
| 2001/0039514 | A1 | 11/2001 | Barenbaum et al. | |
| 2001/0044751 | A1 | 11/2001 | Pugliese, III et al. | |
| 2001/0047296 | A1 | 11/2001 | Wyker | |
| 2001/0047311 | A1 | 11/2001 | Singh | |
| 2002/0007324 | A1* | 1/2002 | Centner et al. | 705/26 |
| 2002/0026351 | A1 | 2/2002 | Coleman | |
| 2002/0032573 | A1 | 3/2002 | Williams et al. | |
| 2002/0035536 | A1 | 3/2002 | Gellman | |
| 2002/0040352 | A1 | 4/2002 | McCormick | |
| 2002/0046105 | A1 | 4/2002 | Gardenswartz et al. | |
| 2002/0046147 | A1 | 4/2002 | Livesay et al. | |
| 2002/0052782 | A1 | 5/2002 | Landesmann | |
| 2002/0065762 | A1 | 5/2002 | Lee et al. | |
| 2002/0065769 | A1* | 5/2002 | Irribarren et al. | 705/37 |
| 2002/0069079 | A1 | 6/2002 | Vega | |
| 2002/0080950 | A1 | 6/2002 | Koko et al. | |
| 2002/0082881 | A1 | 6/2002 | Price et al. | |
| 2002/0091580 | A1 | 7/2002 | Wang | |
| 2002/0099643 | A1 | 7/2002 | Abeshouse et al. | |
| 2002/0103741 | A1 | 8/2002 | Boies et al. | |
| 2002/0107773 | A1 | 8/2002 | Abdou | |
| 2002/0116282 | A1 | 8/2002 | Martin et al. | |
| 2002/0143692 | A1 | 10/2002 | Heimermann et al. | |
| 2002/0147670 | A1 | 10/2002 | Lange | |
| 2002/0165771 | A1 | 11/2002 | Walker et al. | |
| 2002/0165821 | A1 | 11/2002 | Tree | |
| 2002/0169703 | A1 | 11/2002 | Lutnick et al. | |
| 2002/0169759 | A1 | 11/2002 | Kraft et al. | |
| 2002/0174051 | A1 | 11/2002 | Wise | |
| 2002/0188508 | A1 | 12/2002 | Lee et al. | |
| 2003/0004802 | A1 | 1/2003 | Callegari | |
| 2003/0004808 | A1 | 1/2003 | Elhaoussine et al. | |
| 2003/0004823 | A1* | 1/2003 | Sagy | 705/26 |
| 2003/0028473 | A1 | 2/2003 | Eso et al. | |
| 2003/0041002 | A1 | 2/2003 | Hao et al. | |
| 2003/0055774 | A1 | 3/2003 | Ginsberg | |
| 2003/0088494 | A1* | 5/2003 | Lee | 705/37 |
| 2003/0093355 | A1 | 5/2003 | Issa | |
| 2003/0109949 | A1 | 6/2003 | Ikeda | |
| 2003/0111531 | A1 | 6/2003 | Williams et al. | |
| 2003/0115100 | A1 | 6/2003 | Teicher | |
| 2003/0126040 | A1 | 7/2003 | Mesaros | |
| 2003/0126250 | A1 | 7/2003 | Jhanji | |
| 2003/0149619 | A1 | 8/2003 | Stanley et al. | |
| 2003/0167222 | A1 | 9/2003 | Mehrotra et al. | |
| 2003/0195832 | A1 | 10/2003 | Cao et al. | |
| 2003/0200150 | A1* | 10/2003 | Westcott et al. | 705/26 |
| 2003/0208412 | A1 | 11/2003 | Hillestad et al. | |
| 2003/0216960 | A1 | 11/2003 | Postrel | |
| 2003/0233276 | A1 | 12/2003 | Pearlman et al. | |
| 2003/0233557 | A1 | 12/2003 | Zimmerman | |
| 2004/0015415 | A1 | 1/2004 | Cofino et al. | |
| 2004/0039661 | A1 | 2/2004 | Fuzell-Casey et al. | |
| 2004/0039677 | A1 | 2/2004 | Mura et al. | |
| 2004/0093276 | A1 | 5/2004 | Nishio | |
| 2004/0128197 | A1 | 7/2004 | Bam et al. | |
| 2004/0215467 | A1* | 10/2004 | Coffman et al. | 705/1 |
| 2004/0215500 | A1 | 10/2004 | Monahan | |
| 2005/0021400 | A1 | 1/2005 | Postrel | |
| 2005/0021401 | A1 | 1/2005 | Postrel | |
| 2005/0038713 | A1 | 2/2005 | Pickard et al. | |
| 2005/0149458 | A1 | 7/2005 | Eglen et al. | |
| 2005/0171918 | A1 | 8/2005 | Eden et al. | |
| 2005/0197857 | A1 | 9/2005 | Avery | |
| 2005/0216337 | A1 | 9/2005 | Roberts et al. | |
| 2005/0272442 | A1 | 12/2005 | Miller et al. | |
| 2005/0273415 | A1 | 12/2005 | Mathews et al. | |
| 2006/0036491 | A1 | 2/2006 | Leung et al. | |
| 2006/0059062 | A1 | 3/2006 | Wood et al. | |
| 2006/0069619 | A1 | 3/2006 | Walker et al. | |
| 2006/0095327 | A1 | 5/2006 | Vaughn et al. | |
| 2006/0095366 | A1 | 5/2006 | Sheth et al. | |
| 2006/0106678 | A1 | 5/2006 | Walker et al. | |
| 2006/0129454 | A1 | 6/2006 | Moon et al. | |
| 2006/0143080 | A1 | 6/2006 | Garg et al. | |

| | | |
|---|---|---|
| 2006/0178918 A1 | 8/2006 | Mikurak |
| 2007/0150349 A1 | 6/2007 | Handel et al. |
| 2007/0220169 A1 | 9/2007 | Silver et al. |
| 2008/0015711 A1 | 1/2008 | Charland et al. |
| 2008/0052189 A1 | 2/2008 | Walker et al. |
| 2008/0082418 A1 | 4/2008 | Fordyce et al. |
| 2008/0126201 A1 | 5/2008 | Ullah |
| 2008/0255886 A1 | 10/2008 | Unkefer et al. |
| 2009/0055328 A1 | 2/2009 | Bamford et al. |
| 2009/0059856 A1 | 3/2009 | Kermoal et al. |
| 2009/0083136 A1 | 3/2009 | Blackwood |
| 2009/0089177 A1 | 4/2009 | Dayton et al. |
| 2009/0187455 A1 | 7/2009 | Fernandes et al. |
| 2009/0198622 A1 | 8/2009 | Temte et al. |
| 2009/0276305 A1 | 11/2009 | Clopp |
| 2009/0307073 A1 | 12/2009 | Mirroknibanadaki et al. |
| 2009/0327034 A1 | 12/2009 | Petersen |
| 2009/0327038 A1 | 12/2009 | Petersen |
| 2009/0327101 A1 | 12/2009 | Sayed |
| 2009/0327140 A1 | 12/2009 | Kuo |
| 2010/0088174 A1 | 4/2010 | Cohagan et al. |
| 2010/0125525 A1 | 5/2010 | Inamdar |
| 2011/0004515 A1 | 1/2011 | Mesaros |
| 2011/0016010 A1 | 1/2011 | Mesaros |
| 2011/0040624 A1 | 2/2011 | Jhanji |
| 2011/0125592 A1 | 5/2011 | Mesaros |
| 2011/0213648 A1 | 9/2011 | Mesaros |
| 2011/0213649 A1 | 9/2011 | Mesaros |
| 2011/0213650 A1 | 9/2011 | Mesaros |
| 2011/0213653 A1 | 9/2011 | Mesaros |
| 2011/0238476 A1 | 9/2011 | Carr et al. |
| 2011/0246271 A1 | 10/2011 | Mesaros |
| 2011/0246274 A1 | 10/2011 | Mesaros |
| 2011/0264499 A1 | 10/2011 | Abendroth et al. |
| 2011/0270699 A1 | 11/2011 | Mesaros |
| 2011/0270700 A1 | 11/2011 | Mesaros |
| 2012/0022970 A1 | 1/2012 | Mesaros |
| 2012/0029993 A1 | 2/2012 | Mesaros |
| 2012/0029995 A1 | 2/2012 | Mesaros |
| 2012/0035999 A1 | 2/2012 | Mesaros |
| 2012/0036000 A1 | 2/2012 | Mesaros |
| 2012/0036031 A1 | 2/2012 | Mesaros |
| 2012/0041811 A1 | 2/2012 | Mesaros |
| 2012/0054012 A1 | 3/2012 | Mesaros |
| 2012/0158475 A1 | 6/2012 | Mesaros |
| 2012/0179526 A1 | 7/2012 | Mesaros |
| 2012/0179530 A1 | 7/2012 | Mesaros |
| 2012/0197705 A1 | 8/2012 | Mesaros |
| 2012/0197722 A1 | 8/2012 | Mesaros |
| 2012/0203603 A1 | 8/2012 | Mesaros |
| 2012/0203611 A1 | 8/2012 | Mesaros |
| 2012/0203615 A1 | 8/2012 | Mesaros |
| 2012/0209683 A1 | 8/2012 | Mesaros |
| 2012/0209737 A1 | 8/2012 | Mesaros |
| 2012/0209738 A1 | 8/2012 | Mesaros |
| 2012/0209739 A1 | 8/2012 | Mesaros |
| 2012/0209740 A1 | 8/2012 | Mesaros |
| 2012/0209743 A1 | 8/2012 | Mesaros |
| 2012/0226541 A1 | 9/2012 | Mesaros |
| 2012/0245993 A1 | 9/2012 | Mesaros |
| 2012/0253912 A1 | 10/2012 | Mesaros |
| 2012/0253977 A1 | 10/2012 | Mesaros |
| 2012/0265590 A1 | 10/2012 | Mesaros |
| 2012/0265600 A1 | 10/2012 | Mesaros |
| 2012/0278157 A1 | 11/2012 | Mesaros |
| 2012/0290395 A1 | 11/2012 | Mesaros |

FOREIGN PATENT DOCUMENTS

| | | |
|---|---|---|
| WO | WO 00/50970 | 8/2000 |
| WO | WO 00/70424 | 11/2000 |
| WO | WO 2008/083371 | 7/2008 |

OTHER PUBLICATIONS

U.S. Appl. No. 12/710,095 Final Office Action mailed Jun. 28, 2012.
U.S. Appl. No. 12/881,923 Office Action mailed Jun. 29, 2012.
U.S. Appl. No. 13/345,681 Office Action mailed Jun. 20, 2012.
"Magna Cash Cybersource Partner to Expand Online Payment Options," PR Newswire, New York, Jan. 15, 2001.
Abad, P.L. "Supplier pricing and lot sizing when demand is price sensitive". Abad, P.L. Fac. of Bus., McMaster Univ., Hamilton, Ont., Canada. European Journal of Operational Research, vol. 78, No. 3, p. 334-54. Date: Nov. 10, 1994 [recovered from Dialog on Oct. 20, 2009].
Accompany: How it Works: "Anatomy of a Buy-Cycle", Jun. 15, 1999, pp. 1-3.
Adam et al. "Strategic Directions in Electronic Commerce and Digital Libraries: Towards a Digital Agora". *ACM Computing Surveys* [Online] 1996, vol. 28, Issue 4, pp. 818-835.
Amazon.com, "Earths Biggest Selection," Jun. 30, 2001, archived by Archive.org: http://web.archive.org/web/20010630130618/http://www.amazon.com/exec/obidos/subst/home/home.html.
Amazon.com, "Help/Shipping", Archived on Feb. 2, 2003 by www.archive.org. Last accessed Mar. 19, 2008, 9 pages.
Anon, "Global Real Estate Markets Spell Opportunity, Experts Tell Realtors," PR Newswire, Nov. 21, 1991.
Anon, "MobShop Selected by WHN(TM) (WhatsHotNow.com (R), Inc.) to Power Demand Aggregation Within Its Licensed Merchandise Marketplace; Demand Aggregation Technology Enables Marketplaces to Improve Liquidity by Generating Volume Transactions," PR Newswire, San Francisco, Jan. 16, 2001.
Anon., "China—Welcome to the Machine: New Machinery, Electronics b-to-b Web," China Online, Jul. 24, 2000.
Anon., "Domain TradeLIVE! Launched by solutionhome.com," Business Wire, Oct. 20, 1999.
Anon., "ELCOM: Virgin Trains Cuts Procurement Costs with elcom. com; New Electronic Ordering System Offers Personalised Pricing," M2 Presswire, Jul. 18, 2000.
Anon., "Excite@Home Standardizes on Siebel eBusiness; Leading Broadband Media Company Relies on Siebel Systems to Manage Customer Relationships Across Its Entire Family of Services," Business Wire, Jan. 19, 2000.
Anon., "Lucent Launches On-Line Catalog," M2 Presswire, Jan. 22, 1999.
Anon., "Open Market Introduces New Software for Dynamic Web-Based Commerce" PR Newswire, Oct. 1, 1996.
Anon., "Screen Savers," Lawyer, Feb. 19, 2001.
Anon., "The Oil & Gas Asset Clearinghouse, a Petroleum Place Company, to Host Its Second Exclusively Online Auction of Oil & Gas Properties on Aug. 14-16, 2000," PR Newswire, p. 5591, Aug. 3, 2000.
Ashton Technology Group, Inc. Announces NASDAQ National Market System Listing; Enters into Clearing Arrangements with 8 National Brokerage Firms, Business Wire, Jan. 3, 2000. http://www.findarticles.com/p/articles/mi.sub.--m0EIN/is.sub.--2000.sub.---Jan.sub.--3/ai.sub.--58429780/print. Last accessed Apr. 8, 2009, 3 pages.
Beaty. Mass Customisation. Manufacturing Engineer, vol. 75, issue 5, Oct. 1996, pp. 217-220.
Blyth, et al. Merchandising System Collecting Data. Derwent Information Ltd. Last accessed Jan. 20, 2009, 2 pages.
Boroshok, Jon, "Wireless, Location-Based, Shopping Portal being Tested in New York City and San Francisco by GeePS.com, Inc.," published Apr. 3, 2000, New York, NY and San Francisco, CA; as downloaded from http://www.techmarcom.com/geeps.html on Jan. 6, 2012.
Breyer. "Bargains in Cyberspace," National Home Center News, vol. 26, No. 21, p. 21, Nov. 20, 2000.
Business Editors and High Tech Writers, "eWinWin Announces the Release of DAS 3.0, the Next Generation of B2B Demand Aggregation Solutions" Dec. 28, 2000, Businee wire, p. 1 (4 pages).
Business Editors. "Weatherchem Announces Major eCommerce Success with eWinWin", Aug. 9, 2001, Business Wire, (p. 1) 2 pages.
Business/High Tech Editors "Mercata Launches Compelling Alternative to Online Auctions," Business Wire, Nov. 15, 2000.
Chicago Board of Trade, "Knowledge Center," as archived by Archive.org, on Feb. 13, 2003.
Computer Geeks Discount Outlet, "Order Status," Mar. 1, 2002.
De Gheest, Computer Implemented Electronic Bidding for Electronic Sales Application. Derwent Acc No. 2001-006585, © Derwent Information Ltd. Last accessed Sep. 17, 2010, 2 pages.

Deierlein. "Smart Fuel Buying," Fleet Equipment, vol. 24, No. 8, pp. 42-44, Aug. 1998.

DiBiase. The Inventory Simulator: A Micro Computer Based Inventory Model. Modeling and Simulation on Microcomputers, Paul F. Hogan, ed., Society for Computer Simulation (SCS), La Jolla, pp. 104-106, Jan. 1987.

Easley, et al. Time and the Process of Security Price Adjustment, Journal of Finance, vol. 47, No. 2, Jun. 1992. http://ideas.repec.org/a/bla/jfinan/v47y1992i2p576-605.html. Last accessed Sep. 10, 2009, 30 pages.

ebay.com "eBay Services: The Feedback Forum," Aug. 1, 2001, archived by archive.org: "http://web.archive.org/web/20010801145144/http://pages.ebay.com/services/forum/feedback.html".

Edwards, L.M., "Increase Your Bottom Line: Automated Customer Service and Marketing," E-Business Advisor, vol. 17, No. 7, p. 30, Jul. 1999.

Enos. Vying to be the Top Dog. Upside vol. 12, No. 3, pp. 160-165, Mar. 2000.

eWinWin, "eCommerce Redefined : The Positive Impact of eWinWin's Demand Aggregation System on the Manufacturing Supply Chain", Oct. 2000. Last accessed Mar. 19, 2008, 11 pages.

Gaonkar, et al. Strategic Sourcing and Collaborative Planning in Internet Enabled Supply Chain Networks Producing Multigeneration Products. IEEE Transactions on Automation Science and Engineering, vol. 2, issue 1, Jan. 2005, pp. 54-66.

Garner, K., "Culture Vulture: Up from Under—Germaine Greer," Off our Backs, Jun. 24, 1971, vol. 1, Iss. 23, p. 14.

Gurley. Creating a Great E-Commerce Business. Fortune, Mar. 16, 1998.

Ha, Sung Ho et al., "Matching Buyers and Suppliers: An Intelligent Dynamic-Exchange Model," IEEE Intelligent Systems, 2001.

Hinze, Annika et al., "Location- and Time- Based Information Delivery in Tourism," as downloaded Apr. 20, 2012 from http://page.mi.fu-berlin.de/voisard/Papers/sstd03.pdf.

IEEE Xplore Search Results, Aug. 12, 2007.

International Search Report and Written Opinion for PCT Application No. PCT/US07/89195, mailed May 12, 2008, 8 pages.

Jonsson et al., "Impact of Processing and Queueing Times on Order Quantities," Material Flow, vol. 2, No. 4, pp. 221-230, Aug. 1985.

Kantrow, American Express Sets a Three-Tier Pricing on Optima, Dialog: File 148 #05812190 (The Gale Group), American Banker, v157, n25, p. 1(2), Feb. 6, 1992.

Kauffman et al., "Bid Together Buy Together, on the Efficacy of Group-Buying Business models in Internet-based Selling," May 16, 2001.

Koenig, et al. Quantitative Industrial Ecology. IEEE Transactions on Systems, Man and Cybernetics, Part C, Issue 1, Feb. 1998, pp. 16-28.

Lamparter, W.C., "Natural Selection," American Printer, vol. 217, No. 3, pp. 54-64, Jun. 1996.

Mack, Going Local. Adweek, Jul. 10, 2000, pp. 38-.6, © 2006 ProQuest Info&Learning. Last accessed Sep. 17, 2010, 2 pages.

Market Engineering Research for Structural Impacts of e-Business in the European Chemicals Industry (Ch. 3), Structural Impact of e-Business on the Chemicals Industry, Frost & Sullivan, Market Research Report, Jun. 2001.

Maxwell, Pricing education in the United States of America: responding to the needs of business, the Journal of Product & Brand Management, Santa Barbara, Aug. 1998, vol. 7, Issue 4, p. 336-341.

Medrano, et al. Strategic Behaviour and Price Discovery, RAND Journal of Economics, vol. 32, No. 2, Jun. 21, 2001 https://editorialexpress.com/cgi-bin/rje.sub.--online.cgi?action=view&year=2001&issue=sum&page=221&&tid=83197&sc=uogfbloa. Last accessed Sep. 3, 2009, 29 pages.

Mercata.com "How to Ship an Order" Oct. 22, 2000, archived by archive.org: http://web.archive.org/web/20001022035135/http://www.mercata.com/cgi-bin/mercata/mercata/v1/pages/editorial.jsp?name=Ship+an+Order.

Mercata.com, archived by archive.org on or before Jun. 19, 2000.

Meridex Introduces Advanced Features to its B2B Network, PR Newswire, May 25, 2000. http://www.canadait.com/cfm/index.cfm?It=106&Id=3421&Se=355&Sv=- Company&Lo=441. Last accessed Apr. 30, 2009, 3 pages.

Merriam-Webster's Collegiate Dictionary, Tenth Edition, 1997, p. 732.

Mesaros. Innovation in Difficult Times : How US Manufacturers are Using Demand Aggregation to Increase Sales and Lower Costs. Jul. 26, 2001. Last accessed Mar. 19, 2008, 4 pages.

Millman, H., "Legacy Data Links Shrinks Costs," InfoWorld, vol. 20, No. 1, pp. 51, 56, Jan. 5, 1998.

MobShop Launches New Rev of Selling App, Online Reporter, May 28, 2001. http://findarticles.com/p/articles/mi.sub.--hb5932/is.sub.--200105/ai.sub-.--n23884526/. Last accessed Apr. 30, 2009, 2 pages.

Moody. From E-Commerce to We-Commerce. Computer Weekly, 42, Jun. 3, 1999. Last accessed Apr. 9, 2009, 2 pages.

Mullich, J., "Altrade Serves as a Natural Resource—a Head Start and Big Trading Volume Give the Natural Gas Marketplace a Competitive Edge. Can It Last?" InformationWeek, p. 152, Jun. 12, 2000.

Munson, Donald "Trading in Futures Can Provide Considerable Financial Rewards", CBOT, Last accessed Mar. 19, 2008, 41 pages.

Myers. "E-Solutions for Surplus Inventory," Dsn Retailing Today, vol. 39, No. 21, p. 13, Nov. 6, 2000.

Nellore, et al. Factors Influencing Success in Integrated Product Development (IPD) Projects. IEEE Transactions on Engineering Management, vol. 48, issue 2, May 2001, pp. 164-174.

O'Gorman, et al. Considerations for Connecting Renewable Generation into Bulk Supply Networks. Sixth International Conference on Advances in Power System Control, Operation and Management, ASDCOM 2003, vol. 2, Nov. 11-14, pp. 674-680. Last accessed Sep. 10, 2009, 7 pages.

Park, Sung Eun et al., "Efficient bid pricing based on costing methods for Internet bid systems," Dept. of Comput. Eng., Dongguk Univ., South Korea. Book Title: Web Information Systems—WISE 2006. 7th International Conference on Web Information Systems Engineering. Proceedings (Lecture Notes in Computer Science vol. 42).

Rahim, M.A., et al., "Optimal Decision Rules for Determining the Length of the Production Run" (Abstract only), Computers and Industrial Engineering, vol. 9, No. 2, pp. 195-202, 1985.

Rahim, M.A., et al., "Optimal Production Run for a Process Having Multilevel Tool Wear" (Abstract only), International Journal of Systems Science, vol. 19, No. 1, pp. 139-149, 1988.

Rahim, M.A., et al., "Optimal Production Run for a Process with Random Linear Drift" (Abstract only), Omega, vol. 16, No. 4, pp. 347-351, 1988.

Rajaraman, Rajesh et al., "The Effect of Demand Elasticity on Security Prices for the Poolco and Multi-Lateral Contract Models," IEEE Transactions on Power Systems, vol. 12, No. 3, Aug. 1997.

Rozic, Jeff "Who's Watching While You Surf?" Inside Business 3, 5, 64, May 2001.

Scott. Chains of Trust, Supply Chain Management, Manufacturing Engineer, vol. 75, issue 4, Aug. 1996, pp. 172-174.

Scott. Supply Partnerships and the Effective Management of Low Cost Components. Transforming Your Material Flow: A Practical Insight Into World Class Logistics and Supply Chain Management IEE Colloquium on, Mar. 19, 1996, pp. 2/1-2/4.

Scott. Supply Partnerships in the Aerospace Industry. Transforming Your Material Flow: A Practical Insight Into World Class Logistics and Supply Chain Management IEE Colloquium on, Oct. 24, 1996, pp. 3/1-3/3.

Sivakumar, et al. Price Match Guarantees: Rationale, Implementation, and Consumer Response. Pricing Strategy and Practice, Bradford, 1996, vol. 4, issue 4, 11 pgs. Recovered from ProQuest Database Aug. 25, 2006.

Sjostrom. Price Discrimination by Shipping Conferences. Logistics and Transportation Review, Jun. 1992, [from Dialog.RTM. File 15, Acc.No. 00727777 93-76998].

Stacklin. "Bridgestone Printing Unit Teams with ewinwin", Mar. 25, 2002, Crain's Cleveland Business, vol. 23, issue 12, 3 pages.

Swartz, Wireless Ads: Loved/Loathed. Wireless Review, Oct. 1, 2000, © 2006 The Gale Gropu. Last accessed Sep. 17, 2010.

Tanaka. "As Other Companies Crumble, Ecount Carves Out Niche in Online-Payment Services." Knight Rider Tribune News Service, Washington, Feb. 27, 2002. (Recovered from ProQuest Database Dec. 4, 2006.).

Thomas, et al. JIT: Strategies for Distant Suppliers (Abstract). Business, vol. 40, No. 4, pp. 36-39, Dec. 1990.

Tippr http://www.tipper.com/ Internet Archive (Feb. 29, 2008)—http://web.archive.org/web/20080229121727/http://tippr.com/.
Watson. The Effects of Demand Forecast Fluctuations on Customer Service and Inventory Cost When Demand is Lumpy. Journal of the Operational Research Society, vol. 38, No. 1, pp. 75-82, Jan. 1987. http://www.palgrave-journals.com/jors/journal/v38/n1/abs/jors19879a.html. Last accessed Sep. 10, 2009, 8 pages.
Wayback Machine. "Searched for http://www.ewinwin.com/corp/ewinwinwhitepaper.pdf", Oct. 2, 2008, Archive. org.
WHN Selects MobShop to Power Aggregated Buying for WHN Exchange. Jan. 23, 2001. http://www.allbusiness.com/retail-trade/4291613-1.html. Last accessed Sep. 11, 2009, 2 pages.
Yeh, R.H., et al., "Optimal Production Run Length for Products Sold with Warranty" (Abstract only), European Journal of Operational Research, vol. 120, No. 3, pp. 575-582, Feb. 1, 2000.
Docket No. EWIN-010COB, U.S. Appl. No. 13/271,464 Office Action mailed May 10, 2012.
U.S. Appl. No. 09/922,884 Office Action mailed May 1, 2012.
U.S. Appl. No. 09/922,884 Final Office Action mailed Jan. 4, 2012.
U.S. Appl. No. 13/104,723 Final Office Action mailed Jun. 8, 2012.
U.S. Appl. No. 13/104,723 Office Action mailed Mar. 22, 2012.
U.S. Appl. No. 13/106,622 Final Office Action mailed Jan. 3, 2012.
U.S. Appl. No. 13/270,133 Final Office Action mailed Jun. 12, 2012.
U.S. Appl. No. 13/270,133 Office Action mailed Jan. 3, 2012.
U.S. Appl. No. 13/292,971 Office Action mailed Jun. 14, 2012.
U.S. Appl. No. 12/710,095 Office Action mailed Apr. 6, 2012.
U.S. Appl. No. 13/161,192 Office Action mailed Apr. 5, 2012.
U.S. Appl. No. 13/272,144 Office Action mailed May 16, 2012.
U.S. Appl. No. 13/251,668 Office Action mailed Feb. 9, 2012.
U.S. Appl. No. 13/251,668 Final Office Action mailed Apr. 17, 2012.
U.S. Appl. No. 13/160,128 Final Office Action mailed Feb. 22, 2012.
U.S. Appl. No. 11/618,412 Final Office Action mailed May 1, 2012.
U.S. Appl. No. 13/105,387 Office Action mailed Jan. 3, 2012.
U.S. Appl. No. 13/272,147 Office Action mailed Jan. 10, 2012.
U.S. Appl. No. 11/680,415 Final Office Action mailed May 2, 2012.
*eWinWin, Inc.* v. *Groupon, Inc.* Appeal Per Curiam Decision dated Oct. 9, 2012.
*eWinWin, Inc.* v. *Groupon, Inc.* Reply Brief of Appellant dated Jun. 4, 2012.
*eWinWin, Inc.* v. *Groupon, Inc.* Brief of Appellee dated May 17, 2012.
*eWinWin, Inc.* v. *Groupon, Inc.* Brief of Appellant dated Apr. 2, 2012.
Order re Motion for Summary Judgment dated Nov. 23, 2011.
eWinWin, Inc.'s Opposition to Groupon, Inc.'s Motion for Summary Judgment of Non-Infringement dated Nov. 8, 2011.
Groupon, Inc.'s Motion for Summary Judgment of Non-Infringment dated Oct. 17, 2011.
Order re eWinWin, Inc. Motion for Reconsideration dated Oct. 3, 2011.
Order re Claim Construction dated Sep. 5, 2011.
eWinWin, Inc. Supplemental Brief in Support of Claim Construction dated Aug. 24, 2011.
Groupon, Inc.'s Supplemental Claim Construction Brief dated Aug. 24, 2011.
eWinWin, Inc.'s Reply Brief in Support of Claim Construction dated Aug. 5, 2011.
Groupon, Inc.'s Responsive Claim Construction Brief dated Aug. 5, 2011.
Groupon, Inc.'s Opening Claim Constructin Brief dated Jul. 5, 2011.
Opening Claim Construction Brief of eWinWin, Inc.dated Jul. 5, 2011.
U.S. Appl. No. 13/275,054 Final Office Action mailed Nov. 5, 2012.
U.S. Appl. No. 13/292,971 Office Action mailed Dec. 4, 2012.
U.S. Appl. No. 13/292,971 Office Action mailed Sep. 14, 2012.
U.S. Appl. No. 13/449,275 Office Action mailed Oct. 4, 2012.
U.S. Appl. No. 13/449,276 Office Action mailed Sep. 26, 2012.
U.S. Appl. No. 13/449,658 Office Action mailed Oct. 30, 2012.
U.S. Appl. No. 13/452,647 Office Action mailed Dec. 7, 2012.
U.S. Appl. No. 13/460,512 Office Action mailed Dec. 10, 2012.
U.S. Appl. No. 13/523,820 Office Action mailed Nov. 8, 2012.
U.S. Appl. No. 13/525,040 Office Action mailed Nov. 23, 2012.
U.S. Appl. No. 13/407,622 Office Action mailed Dec. 3, 2012.
U.S. Appl. No. 13/407,622 Office Action mailed Sep. 12, 2012.
U.S. Appl. No. 12/881,923 Final Office Action mailed Oct. 5, 2012.
U.S. Appl. No. 13/251,668 Office Action mailed Sep. 14, 2012.
U.S. Appl. No. 13/345,681 Final Office Action mailed Sep. 20, 2012.
U.S. Appl. No. 13/621,158 Office Action mailed Dec. 5, 2012.
U.S. Appl. No. 13/274,213 Final Office Action mailed Aug. 1, 2012.
U.S. Appl. No. 13/538,302 Office Action mailed Oct. 25, 2012.
U.S. Appl. No. 13/105,387 Final Office Action mailed Aug. 15, 2012.
U.S. Appl. No. 11/618,418 Final Office Action mailed Jul. 26, 2012.
U.S. Appl. No. 11/680,415 Office Action mailed Aug. 31, 2012.
U.S. Appl. No. 13/517,528 Office Action mailed Dec. 6, 2012.

\* cited by examiner

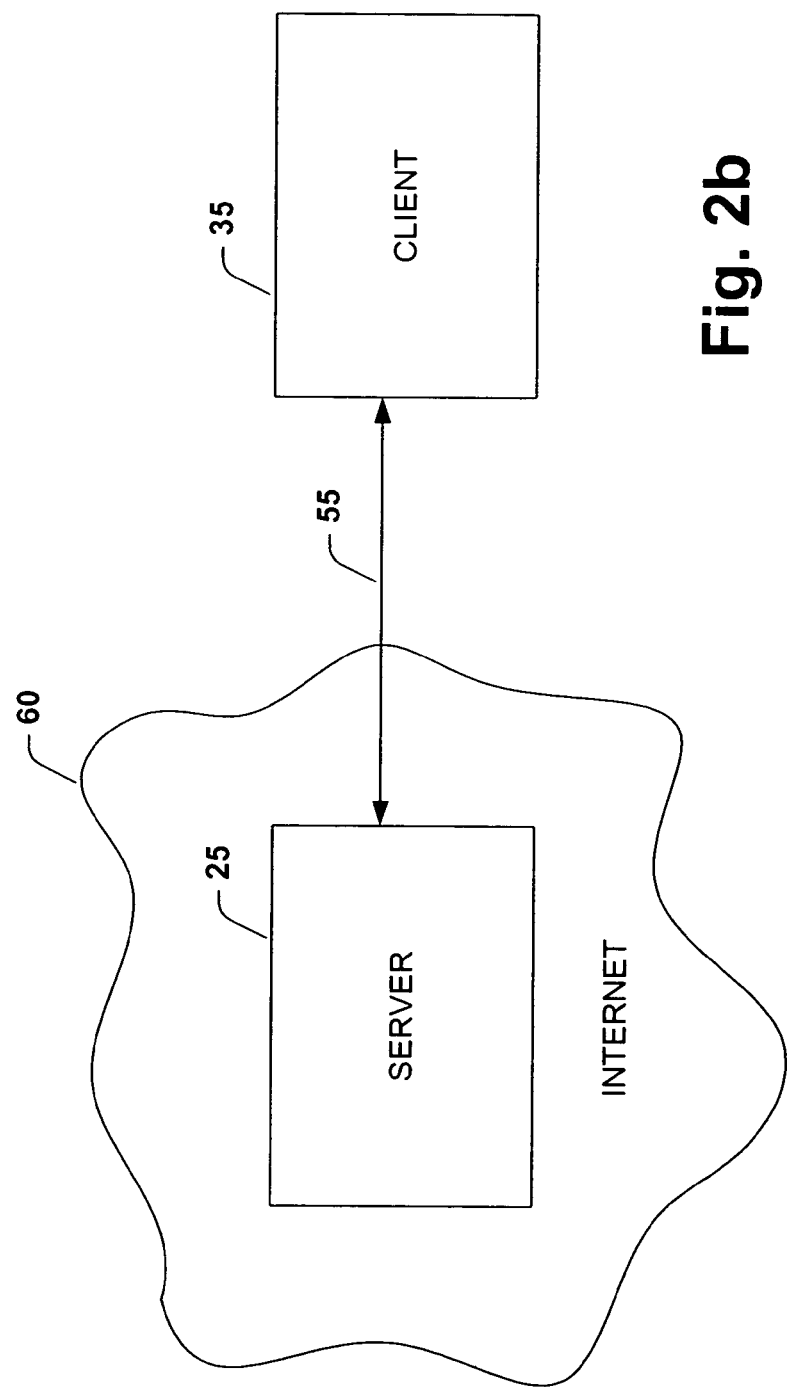

PRODUCT: GLASS

BUYER'S PRODUCT ORDERING CRITERIA

166 — ENTER PRICE RANGE: ____ - ____ (dollars/pound)

168 — ENTER VOLUME RANGE: ____ - ____ (pounds)

170 — ENTER DELIVERY RANGE: ____ - ____ (days)

172 — ENTER ACCEPTABLE % DEFECTS: ____ (percent)

174 — ENTER MINIMUM WARRANTY: ____ (months)

LIST SELLERS PREVIOUSLY USED BUYER

SELLER #1
SELLER #2
SELLER #3
SELLER #4

176

178 — [SEARCH FOR DEAL]

Fig. 4b

DEALS MATCHING ORDERING CRITERIA

| SELLER | DEAL# | VOLUME | P/LBS. | DEL. TIME | WARRANTY | %DEFECTS |
|---|---|---|---|---|---|---|
| SELLER #1 | 1 | OVER 100 | $6.00 | 10 DAYS | 12 MONTHS | 5% |
| | 2 | 30-100 | $7.00 | 5 DAYS | 18 MONTHS | 3% |
| | 3 | 10-30 | $12.00 | 5 DAYS | 36 MONTHS | 0.05% |
| SELLER #2 | 1 | OVER 50 | $5.75 | 7 DAYS | 12 MONTHS | 3% |
| SELLER #3 | 1 | 0-50 | $7.00 | 5 DAYS | 12 MONTHS | 3% |
| | 2 | OVER 50 | $6.50 | 3 DAYS | 12 MONTHS | 3% |
| SELLER #4 | 1 | OVER 10 | $9.00 | 7 DAYS | 24 MONTHS | 1% |
| SELLER #5 | 1 | OVER 50 | $6.25 | 5 DAYS | 12 MONTHS | 3% |

ENTER DEAL

ENTER SELLER: SELLER #3
ENTER DEAL NUMBER: DEAL # 3
ENTER VOLUME ORDER: 90

SUBMIT DEAL

BUYER REGISTRATION

BUYER NAME:

ADDRESS:

PRIMARY CONTACT:

TELEPHONE:

FAX:

E-MAIL:

DESCRIPTION OF COMPANY:

PREFERRED USER NAME:

PREFERRED PASSWORD:

PREFERRED PASSWORD (VERIFICATION):

Fig. 6

| BUYER DATA NAME, ADDRESS, CONTACT, ETC. | USER NAME | PASSWORD | CREDIT CARD NO. & EXP. |
|---|---|---|---|
| BUYER 1 | USER NAME (1) | PASSWORD (1) | XXXXXXXX EXP. 05/03 |
| ... | ... | ... | ... |
| BUYER (N) | USER NAME (N) | PASSWORD (N) | CREDIT CARD (N) |

```
SELLER REGISTRATION

SELLER NAME:

ADDRESS:

PRIMARY CONTACT:

TELEPHONE:

FAX:

E-MAIL:

DESCRIPTION OF COMPANY:

PREFERRED USER NAME:

PREFERRED PASSWORD:

PREFERRED PASSWORD (VERIFICATION):
```

Fig. 10

Bid Form

502

| | | |
|---|---|---|
| Up to 100,000 widgets | $ ____ | per widget |
| 100,001 to 300,000 widgets | $ ____ | per widget |
| 300,001 to 500,000 widgets | $ ____ | per widget |
| 500,001 to 1,000,000 widgets | $ ____ | per widget |

504 Details

First Ship Date: May 10, 2002
Offer open until: March 1, 2002
Volume reach on last offer: 321,000
Total Quantity that must be available: 1,000,000

508 [Modify Prices]

[View Current Low Bids]

[Submit]

506 Remarks

METHOD AND COMPUTER MEDIUM FOR FACILITATING A BUYER-INITIATED FEATURE WITHIN A BUSINESS TRANSACTION

CROSS-REFERENCE TO RELATED APPLICATIONS

The present application is a continuation and claims the priority benefit of U.S. patent application Ser. No. 12/704,280 filed Feb. 11, 2010, which is a continuation and claims the priority benefit of U.S. patent application Ser. No. 10/650,635 filed Aug. 28, 2003, now U.S. Pat. No. 7,689,463, which claims the benefit of U.S. provisional application No. 60/406,475 filed Aug. 28, 2002, the disclosures of which are incorporated herein by reference.

BACKGROUND OF THE INVENTION

1. Technical Field

The present invention relates to demand aggregation and more particularly to a system and method for utilizing a volume pricing curve in conjunction with multiple suppliers.

2. Background of the Invention

The buying and selling of products and services has resulted in a vast array of buying schemes, which are used to vary the price at which such products are sold.

One of the most common buying schemes which business encounter everyday is known as volume buying. According to this buying scheme, sellers set a fixed unit price for their products based on the volume of units that a buyer is willing to purchase. Buyers desiring to purchase products from the seller are each required to pay the same fixed price depending on the volume of units the buyer is purchasing. If a seller finds that the demand for a given product is greater or less than expected, the seller may later adjust the fixed price per unit of the product to account for such findings. Although the fixed price per unit system provides a simple way for a seller to conduct business with multiple buyers, one drawback of this buying scheme is that it fails to provide buyers with a choice between a variety of different buying criteria that may be just as important or more important to the buyer than price.

For example, a buyer that is in need of goods, such as raw materials to make products for an expedited order may be willing to pay a higher price for a faster delivery time. Another buyer may be concerned with the quality of the goods they are purchasing, such that the buyer would pay a higher price for goods having a minimum number of defects. Yet another buyer may be concerned with the warranty time allotted for the goods they are purchasing, and may want the warranty of the goods that they are purchasing to match or exceed the warranty the buyers are offering their own customers.

Yet another buying scheme which has been advanced in recent years is buyer-driven bidding. According to this buying scheme, a single buyer desiring to obtain a product communicates a price at which the buyer is willing to purchase the product to multiple sellers. Each of the sellers is provided an opportunity to review the buyer's price. A sale is complete when one of the sellers agrees to sell the product to the buyer at the price suggested by the buyer. While the buyer-driven bidding scheme provides advantages for certain types of transactions when, for example, sellers may be willing to sell products at lower than normal prices, the uncertainties involved with whether a buyer's offer will be accepted is often problematic for high volume commercial transactions in which the reliability that a transaction will be complete is of paramount importance. Another problem with the present buying schemes is that buyers have no control in determining the criteria of the product or services that they may receive, while the seller has no control of the type of purchase that the buyers request.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

A system and method for demand aggregation with multiple suppliers is provided. At least one buyer can request a plurality of suppliers to respond to an online bid. The suppliers can review terms of the request and accept or submit changes for the buyer's review. Upon agreed terms, the suppliers submit bids based on the request. A price curve displays a lowest price bid for a respective price point on the curve, along with the corresponding supplier. A buyer can then select a supplier based on the curve.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIG. 2b is a schematic illustration of a client computer operatively coupled to a server computer system in accordance with an aspect of the present invention.

FIG. 4b illustrates a buyer's product ordering criteria input screen in accordance with an aspect of the present invention.

FIG. 4c illustrates a list of seller's deals matching the buyer's product ordering criteria in accordance with an aspect of the present invention.

FIG. 6 illustrates an on-line registration form for a buyer in accordance with an aspect of the present invention.

FIG. 7 illustrates a buyer database stored in a central server in accordance with an aspect of the present invention.

FIG. 10 illustrates an on-line registration form for a seller in accordance with an aspect of the present invention.

FIG. 13 is an exemplary bid form in accordance with an aspect of the present invention.

DETAILED DESCRIPTION OF THE INVENTION

Figure 1:
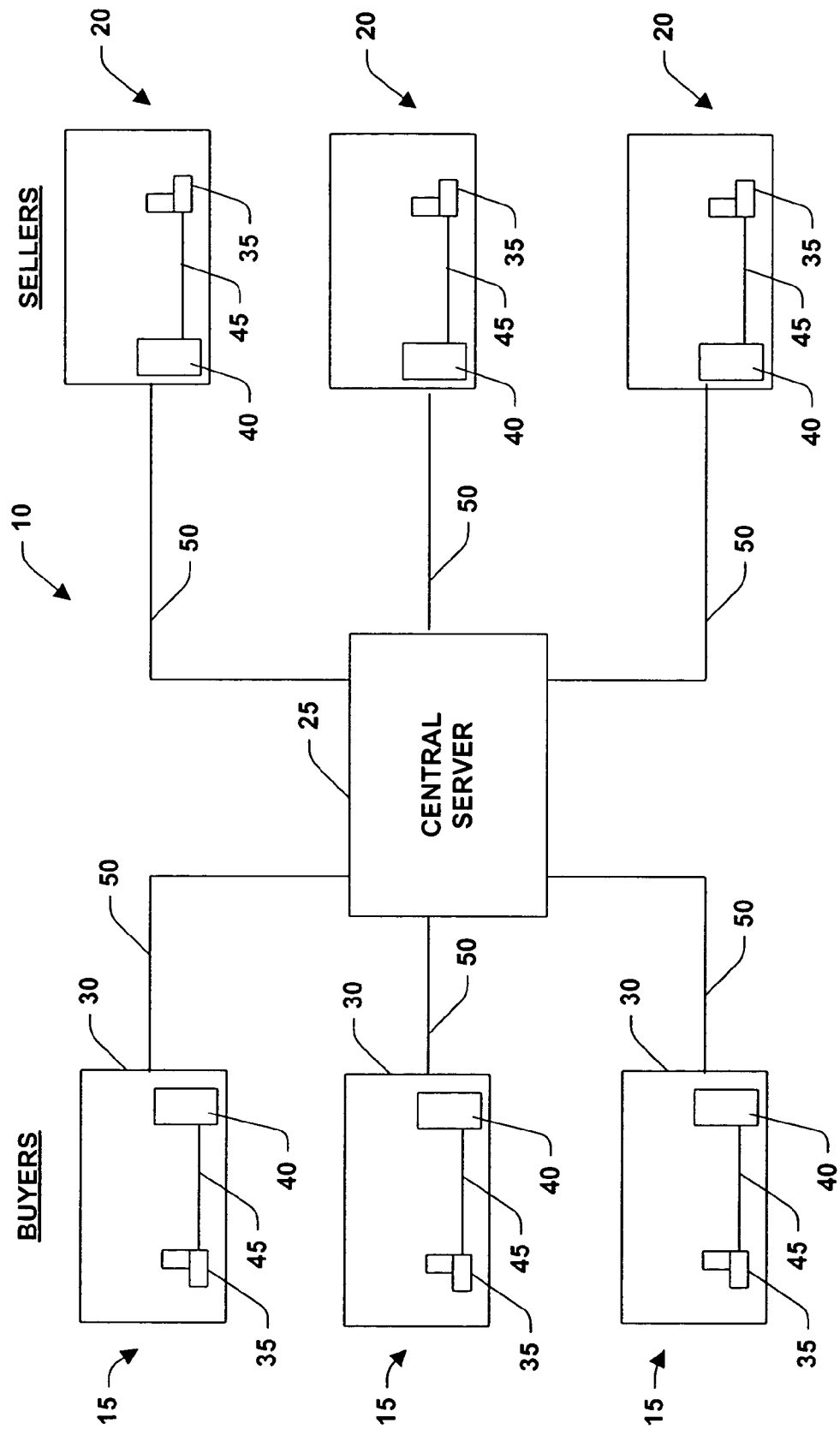
FIG. 1 illustrates a diagrammatic view of a system for electronically conducting business in accordance with an aspect of the present invention.

The present invention will now be described with respect to the accompanying drawings in which like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Referring initially to FIG. 1, a system 10 is shown in which multiple buyers 15 and sellers 20 are electronically linked via a central server 25. As discussed in more detail below, the central server 25 is configured to provide the buyers 15 and sellers 20 with a convenient forum in which to buy and sell goods in accordance with a multiple criteria buying and selling methodology described herein. The forum may, for example, be a pre-established Internet web page where sellers 20 are able to post product information and the buyers 15 are able to order products. The multiple criteria buying scheme calls for a seller 20 to post a number of deals for a given product, which vary according to different offering criteria defining the limits of a number of selling criteria, such as for example, price, volume, quality and delivery time. Each buyer 15 is able to enter a range of criteria that the buyer would require for a deal to be made. A list of sellers and prospective deals offered by these sellers is generated for the buyers to review. Each buyer 15 can then review the list of deals and choose a deal based on the buyers particular needs. In this manner, each of the buyers 15 can be certain that particular thresholds have been met and also be guaranteed of completing a deal.

It is to be appreciated that the present invention has wide applicability to the purchasing and/or selling of a variety of different products and/or services. For example, the present invention may be applied within the context of purchasing and/or selling airline tickets wherein buyers criteria may include, for example: (1) reputation of airline; (2) reliability; (3) timeliness; (4) price; (5) number of alternative flights; (6) comfort; (7) quality of service; and (8) quality of foods. The sellers' criteria may include, for example: (1) volume of tickets; (2) buyer's versatility in time schedule; (3) buyer's method of payment, etc.

The present invention may also be applied in the context of purchasing and/or selling an automobile wherein buyer's criteria may include, for example: (1) reputation of automobile manufacturer; (2) reputation of dealer; (3) price of automobile; (4) delivery options; (5) automobile availability; (6) safety; and (7) financing terms; etc. While, the seller's criteria may include, for example: (1) buyer's creditworthiness; (2) desired finance terms; (3) delivery requests of buyer; (4) delivery dates; etc.

Thus, the present invention intends to allow buyers and/or sellers of products and/or services to pre-select a plurality of criteria prior to negotiating a deal for the product and/or service. Of course the pre-selected criteria will vary depending on the particular product and/or service. The scope of the present invention as defined in the hereto appended claims intends to include any product and/or service (and plurality of pre-selected criteria associated therewith) suitable for deal-making in accordance with the present invention.

Each of the buyers 15 and sellers 20 may access the central server 25 in any of a variety of ways. For example, in the present aspect, each buyer 15 and seller 20 is shown to be part of separate establishments 30 which include one or more respective computer systems 35 and local servers 40. The computer systems 35 may, for example, be a desktop or laptop computer with a local area network (LAN) interface for communicating over a network backbone 45 to the local server 40. The local servers 40, in turn, interface with the central server 25 via a network cable 50 or the like. It will be appreciated that while the present aspect depicts the computer system 35 communicating with the central server 25 via hardwired network connections, in an alternative aspect the computer system 35 may interface with the central server 25 using a modem, wireless local area and/or wide area networks, etc. Further, it will be appreciated, that while the buyers 15 and sellers 20 are shown to communicate with the central server 25 via different computer systems 35, it will be appreciated that the buyers 15 and/or sellers 20 may access the central server 25 from the same computer system 25.

Figure 2A:
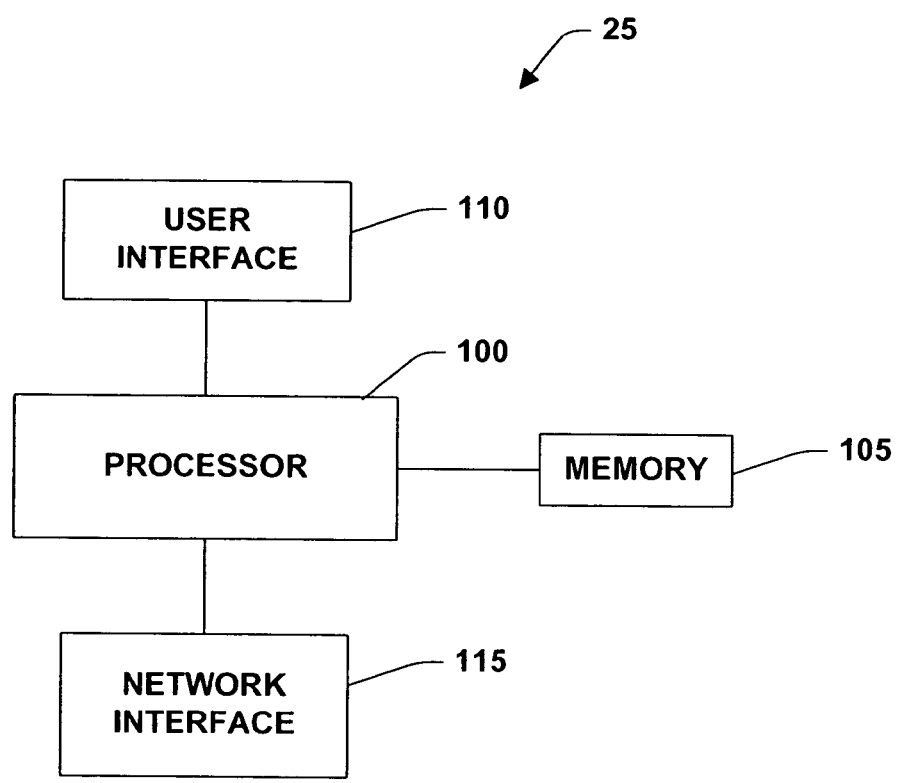
FIG. 2a illustrates a block diagram of a central server in accordance with an aspect of the present invention.

Turning now to FIG. 2a, a block diagram of the hardware components of the central server 25 is shown. In particular, the central server 25 includes a central processor 100 for performing the various functions described herein. A memory 105 is coupled to the processor 100 and stores operating code and other data associated with the operations of the central server 25. A user interface 110 is also coupled to the processor 100 and provides an interface through which the central server 25 may be directly programmed or accessed. The user interface 110 may, for example, be an alphanumeric keyboard and mouse. A network interface 115 coupled to the processor 100 provides multiple connections for transceiving information with buyers 15 and sellers 20 over the network cables 50.

As previously stated, the present invention could take advantage of the wide availability and versatility of the Internet. Referring to FIG. 2b, a schematic block diagram that depicts an environment of interest to one aspect of the present invention. The client computer system 35 is shown connected to the central server computer system 25 that is part of the Internet 60. The client computer system 35 and server 25 are connected via an Internet connection 55 using a public switched phone network, for example, such as those provided by a local or regional telephone operating company. The Internet connection 55 may also be provided by dedicated data lines, Personal Communication Systems ("PCS"), cable, microwave, or satellite networks, for example, or any suitable means. It is to be understood that the terms client and server are to be construed in the broadest sense, and that all such constructions of the terms are intended to fall within the scope of the hereto appended claims.

Figure 3:
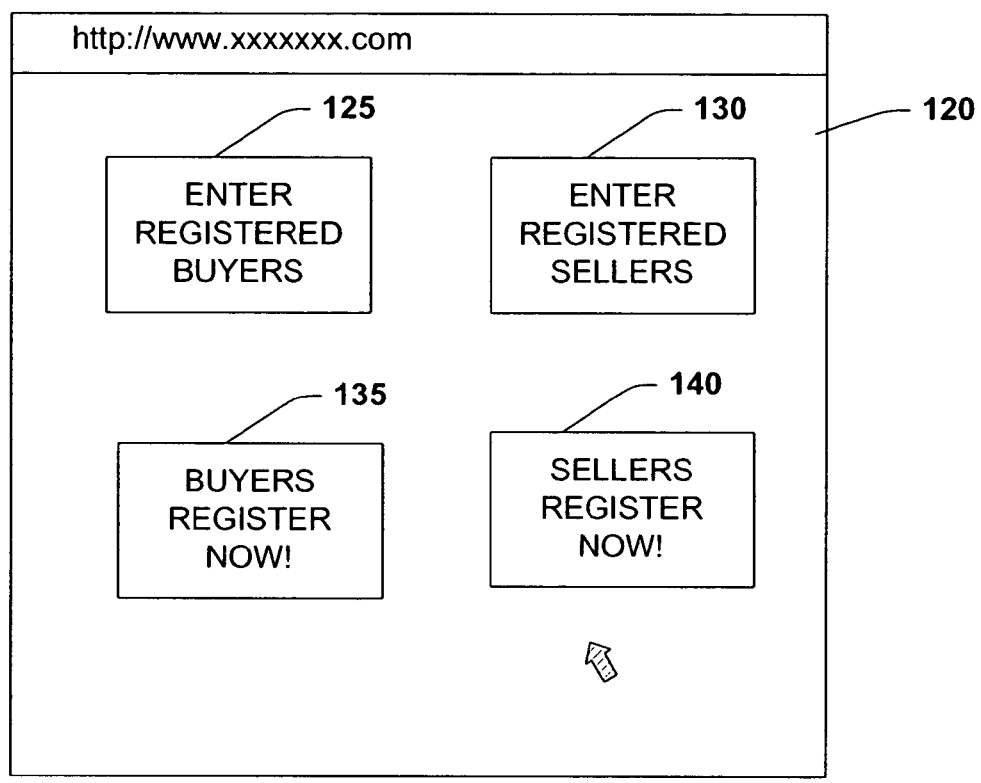
FIG. 3 illustrates a web page providing options to buyers and sellers desiring to conduct business electronically in accordance with an aspect of the present invention.

Turning now to FIG. 3, an exemplary Internet web page 120 which provides buyers 15 and sellers 20 with access to a forum for conducting business using the multiple criteria buying methodology described in detail below, is shown. The web page 120 is shown to include hyperlinks for handling both registered and un-registered buyers and sellers of products. For example, as shown in FIG. 3, registered buyers may select a hyperlink to a registered buyer login screen via hyperlink 125 while non-registered buyers may select a hyperlink to a non-registered buyer registration screen via hyperlink 135. Similarly, registered sellers may select a hyperlink to a registered seller login screen via hyperlink 130, while non-registered sellers may select a hyperlink to a non-registered seller registration screen via hyperlink 140. While the present aspect illustrates separate hyperlinks for buyers and sellers, it will be appreciated that such hyperlinks could alternatively be combined and the status of buyer or seller could be determined during a later stage in the login procedure.

Figure 4A:
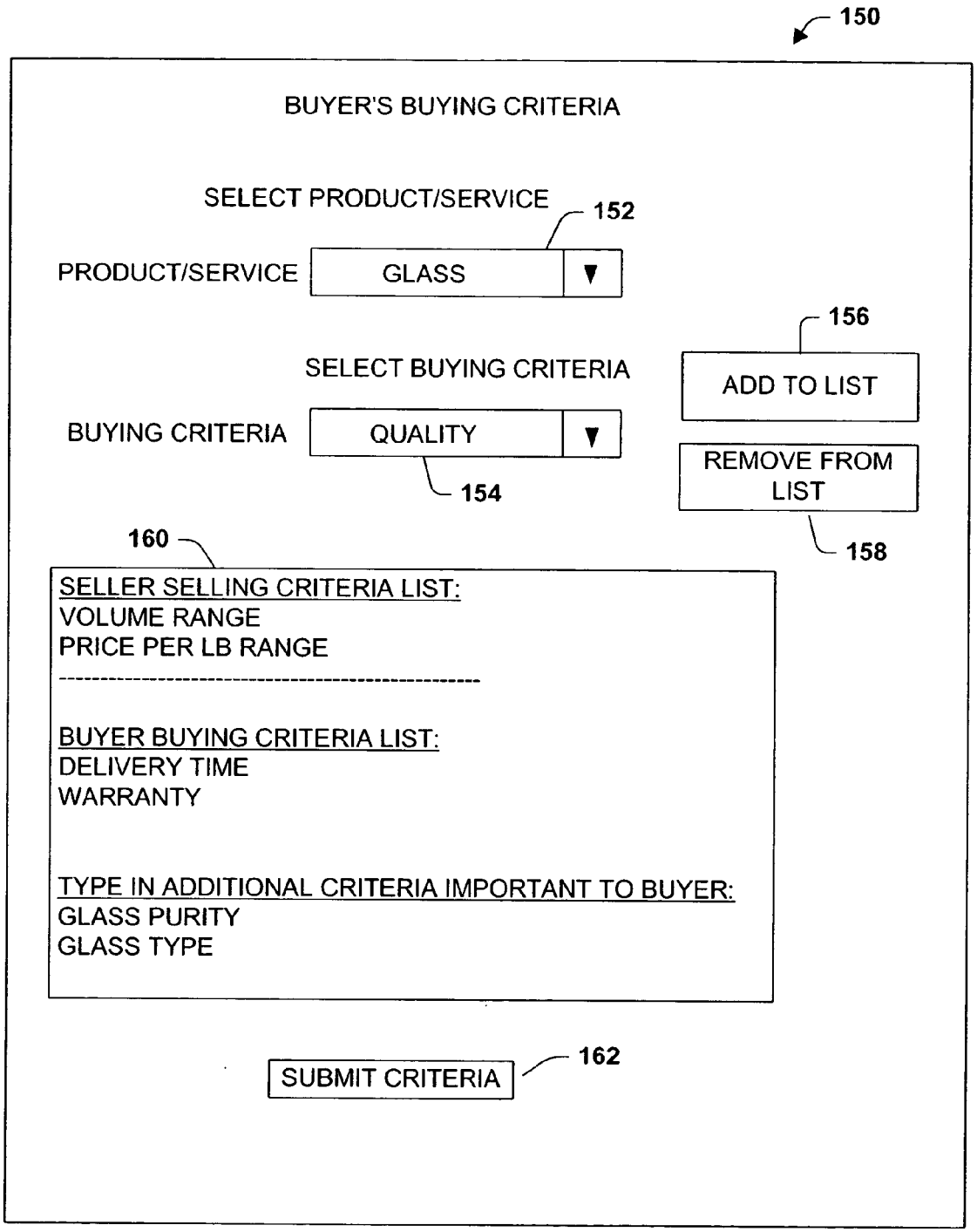
FIG. 4a illustrates a buyer's buying criteria input screen in accordance with an aspect of the present invention.

Turning now to FIG. 4a, in accordance with one aspect of the present invention, registered buyers 15 enter several product buying criteria into a "Buyer's Buying Criteria" input page 150. The buyer 15 selects a product or service from a list in a scroll down menu 152. It should be appreciated that the list on the scroll down menu 152 could include any number of related or non-related goods and services only limited by the size of a database used in accordance with the present invention. Upon selecting a product or service (e.g., glass) from the scroll down menu 152, a list of seller criteria automatically appears in a window 160. The list of seller criteria appearing in the window 160 is the minimum inputs to be provided by the buyer to obtain a deal listing. These minimum inputs are decided by the class of sellers selling the individual product or service and/or decided by the system administrator of the system. The buyer 15 can then begin adding buyer buying criteria by selecting the criteria from a scroll down list 154, and clicking on an "Add to List" button 156 with a computer mouse (not shown), for example. If the buyer 15 desires to remove a buyer buying criteria, it is only necessary to highlight the criteria in the window 160 and click on a "Remove from List" button 158. Once the list is completed, the buyer 15 may add additional criteria thought to be important to the buyer not in the selection of choices. These additional criteria will not be used by the buyer in this particular deal search, but will be provided to the sellers, so that they can be alerted of these additional criteria important to the buyer. The seller may opt to add to the selectable choices these additional buyer's buying criteria at a later time. Once the complete custom buyer buying criteria list is completed, the buyer can click on the "Submit Criteria" button 162 for submission of the buyer's buying criteria to build a "Buyer's Product Ordering Criteria" input screen 165, as illustrated in FIG. 4b.

Turning now to FIG. 4b, in accordance with one aspect of the present invention, registered buyers 15 enter several product ordering criteria that would be acceptable to the buyer 15 on the "Buyer's Product Ordering Criteria" input screen 165. In this particular example, the buyer 15 is looking to purchase raw glass by the pound, however, many different types of products and services could be purchased/sold using the present invention. The buyer's ordering criteria of this example includes: price range 166 in dollars per pound; volume range 168 in number of pounds; delivery range 170 in days; the acceptable % of defects 172 in percent; and the minimum required warranty 174 in months. The buyer 15 can then list the names of the sellers 20 in the window 176 that the buyer 15 has bought products from previously, so that the buyer 15 can be entitled to any good customer or multi-purchase discounts offered by the sellers 20. Once the buying ordering criteria is entered, the buyer can search for deals by clicking on the "Search for Deal" button 178 on the computer screen using the computer's mouse. The present invention then utilizes a search engine to search through a database of deals offered by various sellers of the product, and provides an output of those deals to the buyer that matches the buyer's ordering criteria by outputting a list of these deals on a "Deal Matching Ordering Criteria" output page 180, as shown in FIG. 4c.

Turning now to FIG. 4c. in accordance with one aspect of the present invention, registered sellers 20 set up a variety of deals 182 by which registered buyers 15 are able to order products. As will be discussed in more detail below, the deals 182 of the present aspect are set up to display the following information which is input from the seller 20 and/or calculated by the processor 100 of the central processor 25 according to the deal 182, which includes: a seller name 184; a deal number 186; a volume ordering range required 188 to obtain a current price/pound level 190; an expected delivery time 192; a warranty period 196; and a percentage of defects 198 of the product the buyer 15 can expect to receive in a given order. Based on such information, buyers 15 can make an informed decision as to whether they desire to commit to an order on a particular deal based on the criteria that is important to that particular buyer. If a buyer 15 desires to place an order, the buyer 15 inputs a seller 183, a deal number 185 and a volume order 187. The buyer 15 then clicks on the "Submit Deal" button 189 with a mouse pointer, for example, on the computer display and the deal is finalized.

Figure 5:
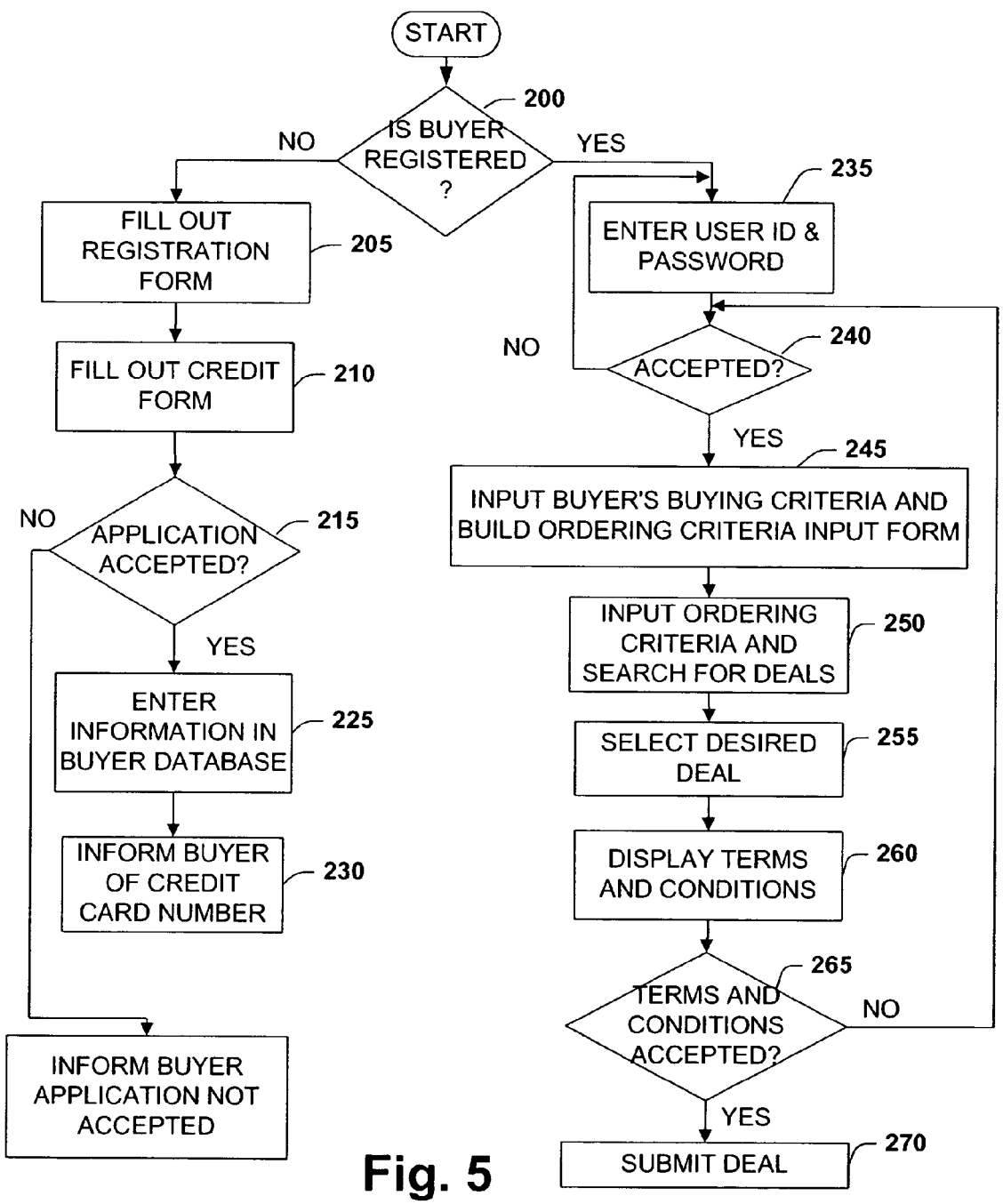
FIG. 5 illustrates a flow chart for a buyer desiring to conduct business electronically in accordance with an aspect of the present invention.

Turning now to FIG. 5, the general steps taken by a buyer 15 entering the web page 150 is shown. More particularly, in step 200 it is initially determined whether a buyer 15 is registered or not. If the buyer 15 is not registered, the buyer 15 selects hyperlink 135 (FIG. 3) and proceeds to step 205. In step 205 the processor 100 of the central server 25 requests that the buyer 15 fill out a registration form. For example, the buyer 15 is requested to fill out a registration form 208 such as that shown in FIG. 6. In the present example, the registration form 208 requests that the buyer 15 enter the following information: buyer name; address; primary contact person; phone; fax; e-mail; short description of company; preferred login user name; and preferred password. With respect to the user name and password, the processor 100 is configured to determine whether the selected user name and password combination are available and, if not, to prompt the buyer 15 to enter a new user name and password until an available combination is selected.

In step 210 (FIG. 5), the buyer is requested to fill out a credit card application so that purchases made on the web site may be immediately approved. The credit card registration and approval process may be accomplished via a hyperlink to one of various electronic credit card approval agencies which check the buyer's credit rating and set up a merchant account with a line of credit. For example, an electronic credit card approval agency which may be used in conjunction with the present invention can be found on the Internet at http://www.interent-ecommerce.com. Next, in step 215, the processor 100 determines if the credit card application has been approved by the electronic credit card approval agency. If the credit card application has not been approved, the processor 100 proceeds to step 220 where a message is sent back to the buyer 15 indicating regret that they have not been approved for a line of credit and therefore have not successfully completed the registration process. In step 220, a customer service telephone number also is provided to the buyer 15 in case the buyer has questions and/or desires to pursue registration further.

If in step 215, the processor 100 is informed that the buyer 15 has been provided a line of credit and a credit card number has been issued, the processor 100 proceeds to step 225. In step 225 the buyer information from the registration form 208 and the newly issued credit card number are stored in a buyer database 270 (FIG. 7) in the memory 105 of the processor 25 (FIG. 2a). Next, in step 230, the processor 100 is configured to provide the buyer 15 with the newly issued credit card number so that the buyer 15 is able to purchase products and/or services. Furthermore, the processor 100 is configured to provide a report to the system administrator who then mails a confirmation copy of the buyer's information stored in the buyer's database to the buyer 15. This completes the buyer's registration process.

Continuing to refer to FIG. 5, if in step 200, a buyer has already registered, the buyer 15 may login as a registered user by selecting the registered user hyperlink 125 (FIG. 3). Once selected, the processor 100, in step 240 prompts the buyer 15 to enter a user ID and password. Upon entry of such information, the processor 100 in step 240 verifies the user ID and password with those stored in the buyer database 270 (FIG. 7). If the user ID and password entered by the buyer 15 does not match any entry in the buyer database 270, the processor 100 in step 240 returns to step 235 for re-entry of such information. If, however, in step 240, a valid user ID and password are entered, the processor 100 proceeds to step 245.

In step 245, the processor 100 provides the buyer 15 with a buyer's buying criteria input screen where the buyer 15 is able to enter a variety of buying criteria that is important to that particular buyer 15. The buyer 15 selects a plurality of buying criteria and submits the criteria, so that the system can build an input ordering criteria form. In step 250, the buyer 15 enters the range of ordering criteria that is acceptable to the buyer in the input ordering criteria form, and then submits this criteria causing the system search engine to match the ordering criteria with a list of seller deals in a seller deal database. The search engine then lists the seller deals matching the buyer's buying and ordering criteria. As discussed above, the deals 182 provided to the buyer 15 provide the buyer 15 with information regarding the sale of a particular product such as, for example, the volume range to get a particular price per pound, the delivery time, the warranty period and the percentage of defects in each order that a buyer can expect. In order to allow a buyer to quickly find deals 182 of interest, the processor 100 in step 245 provides the buyer 15 with the input "Buyer's Buying Criteria" input screen 150, so that active deals 182 of interest may be found.

Once a search is completed, the buyer 15 in step 250 is able to select a desired deal 182 from the results obtained. For example, the buyer 15 may choose a desired deal because it has a faster delivery time than the other deals. The buyer 15 may choose a deal because it has a low percentage of defects in the goods, or has a longer warranty than other goods. Regardless of the deal, the buyer 15 may choose, the buyer 15 can make an informed decision based on a variety of buying criteria. If the buyer 15 is unsatisfied with the search results or simply desires to re-perform the search, the buyer 15 at any time is able to return back to a previous screen selecting the "back" function available using an Internet browser such as, for example, Microsoft Internet Explorer™, Netscape™, etc. Additionally, a hyperlink to various screens, such as the search screen, preferably is provided on each web page.

Upon selecting a deal 182, the processor 100 in step 255 displays a page of standard terms and conditions which the buyer 15 must agree to prior to completing the deal. The terms and conditions relate to the terms governing the sale of the product or service according to which both the buyer and seller are willing to conduct business. If the terms and conditions are not accepted, the processor 100 returns the buyer 15 to step 245, so that another deal 182 may be selected and/or another search may be performed. If, however, in step 260 the terms and conditions are accepted, the processor 100 proceeds to allow the buyer 15 to complete the deal in step 265.

Figure 8A:
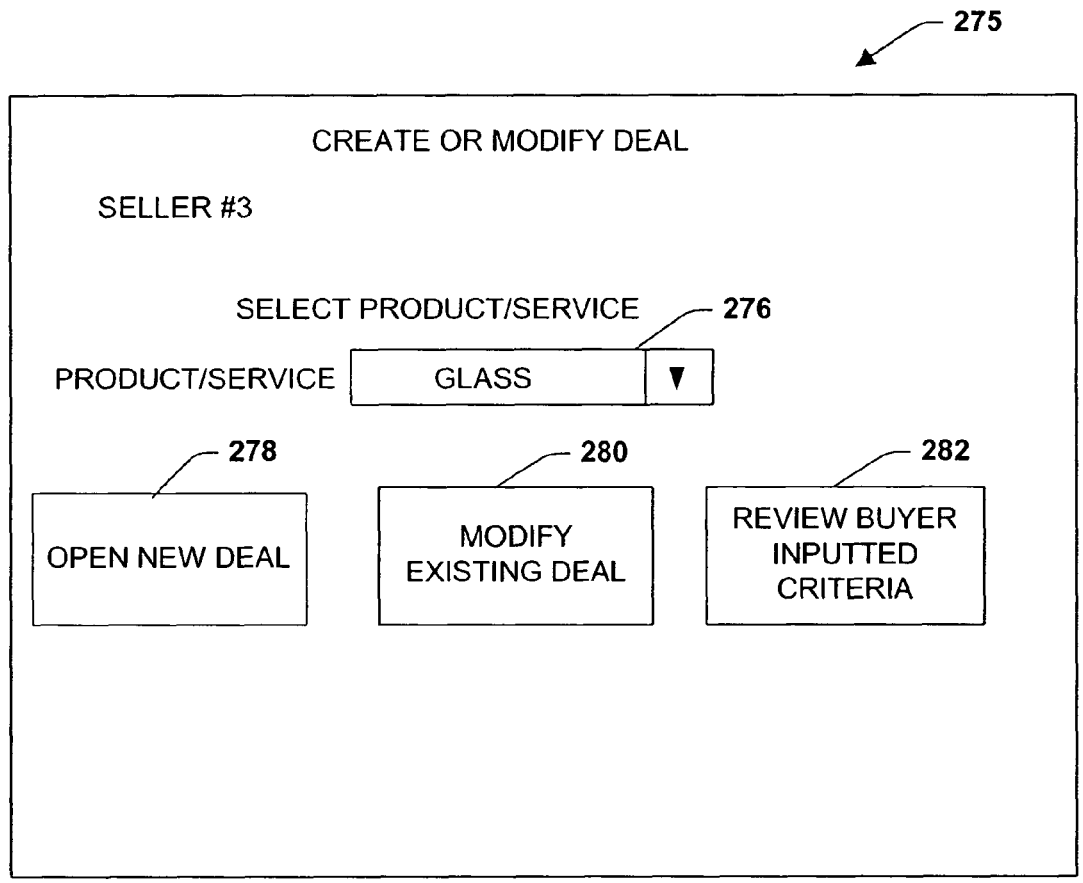
FIG. 8a illustrates a web page for a buyer to create or modify a deal in accordance with an aspect of the present invention.
Figure 8B:
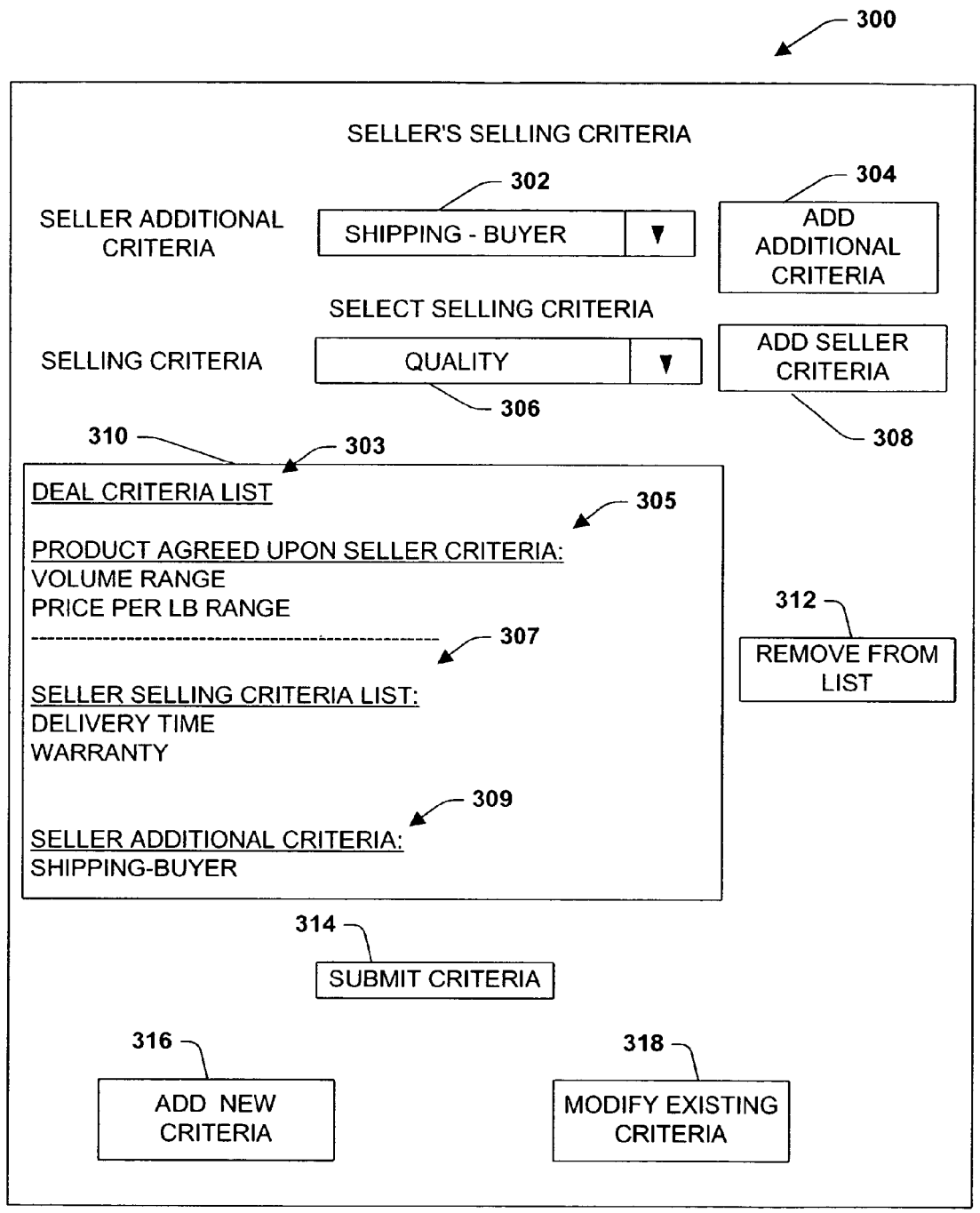
FIG. 8b illustrates a seller's buying and selling criteria input screen in accordance with an aspect of the present invention.

Turning now to FIG. 8a, in accordance with one aspect of the present invention, registered sellers 20 enter into a "Create or Modify Deal" screen 275. The seller 20 can choose a product or service from the product/service scroll down menu 276 and choose to either click on an "Open New Deal" button 278, a "Modify Existing Deal" button 280 or a "Review Buyer Inputted Criteria" button 282. If the buyer selects the "Review Buyer Inputted Criteria" button 282, the seller will be provided with a list of buyer buying criteria that the buyers 15 manually inputted into the window 160 of FIG. 4a. This allows the sellers 20 to review criteria that is important to their buyers, which the seller were not aware. If a seller 20 chooses to click on the "Open New Deal" button 278, the seller 20 will enter into a "Seller's Product Selling Criteria" input screen 300, as illustrated in FIG. 8b. If the seller 20 chooses to click on the "Modify Existing Deal" button 280, the seller 20 will enter into a "Seller's Product Offering Criteria" input screen 330, as illustrated in FIG. 8c with the seller being prompted to enter a deal number, which causes the ordering criteria of the chosen deal number to be editable in the input screen.

Referring to FIG. 8b illustrating the "Seller's Selling Criteria" input screen 300, the seller 20 can begin building a new deal by first selecting a number of seller additional criteria, and seller criteria from a list in a scroll down menu 302 and a list in scroll down menu 306, respectively. The seller can click on the "Add Seller Additional Criteria" button 304 for adding seller additional criteria from the scroll down menu 302 into a window 310 containing a deal criteria list 303. The deal criteria list 303 includes a first portion listing the "Product Agreed upon Seller Criteria" 305, decided by the group of sellers for a particular product/service and/or the system administrator, a second portion which is the seller criteria list 307 and a third portion which is the seller additional criteria list 309. It should be noted that the criteria in the seller additional criteria list is not a mandatory criteria for the buyer when the buyer is inputting the buyer's buying criteria in step 245 of FIG. 5, but is listed in the terms and condition step 265 after a deal is chosen by the buyer. The seller can add seller criteria by selecting the criteria from the scroll down bar 306 and clicking on the "Add Seller Criteria" button 308. The seller can remove any of the criteria from the overall criteria list, except for the "Product Agreed upon Seller Criteria", by highlighting the selection with the computer mouse and clicking on a "Remove from List" button 312. The seller 20 can add new selling criteria by clicking on a hyperlink 316 labeled "Add New Criteria" sending the seller 20 to an "Adding and Modifying Deal Criteria" screen 360, illustrated in FIG. 8d. The seller can modify criteria by highlighting the criteria in window 310 and clicking on a hyperlink 318 labeled "Modify Existing Criteria" sending the seller to the "Adding and Modifying Deal Criteria" screen 360 with the criteria information defaulting to the highlighted criteria for modification therefrom.

Figure 8C:
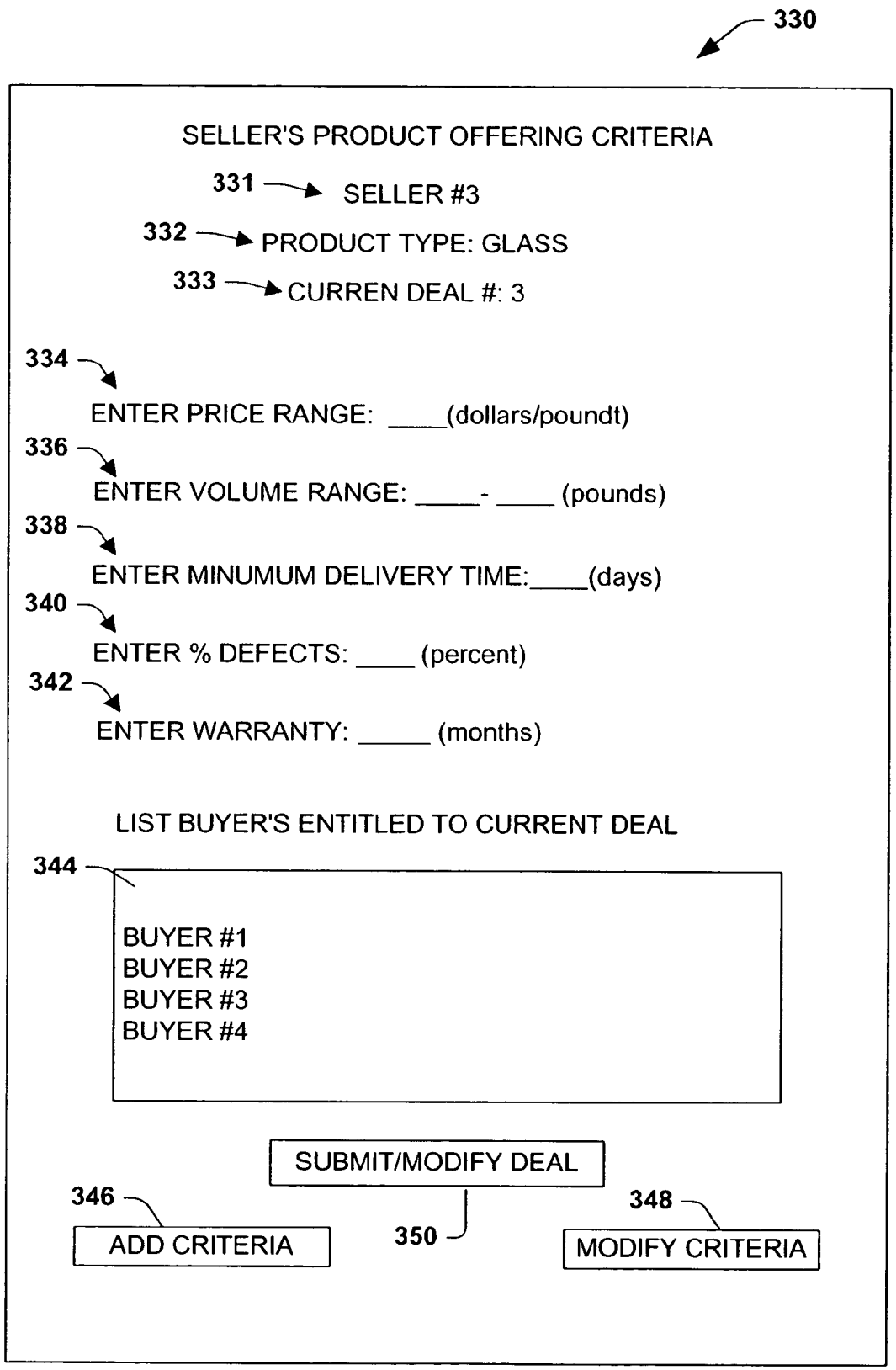
FIG. 8c illustrates a seller's product ordering criteria input screen in accordance with an aspect of the present invention.

Referring now to FIG. 8c, once the criteria is/are selected and submitted, the system generates the "Seller's Product Offering Criteria" input screen 330. A seller number 331, a product type 332 and a current deal number 333 are automatically generated at the top of input screen 330. The seller 20 can enter offering limits relating to the selling criteria of the seller's product for a particular deal. The seller's offering criteria of this example includes: price 166 in dollars per pound; volume range 168 in the number of pounds; delivery time 170 in days; the % of defects 172 in percent; and the warranty 174 in months. The seller 20 can then list the names of the buyers 15 in a window 344 that the deal is being offered or type in the term "All" if the offer is open to any buyer. Once the seller offering criteria is entered, the seller 20 can submit the deal by clicking on a "Submit/Modify Deal" button 350 on the computer screen by using the computer's mouse. The present invention then creates a record of the deal in a database of deals offered by various sellers 20 of the product, so that deals which seller's offering criteria match the buyer's ordering criteria can be outputted to the buyer 15 in a list of deals on the "Deals Matching Ordering Criteria" output page 180, as shown in FIG. 4c.

Figure 8D:
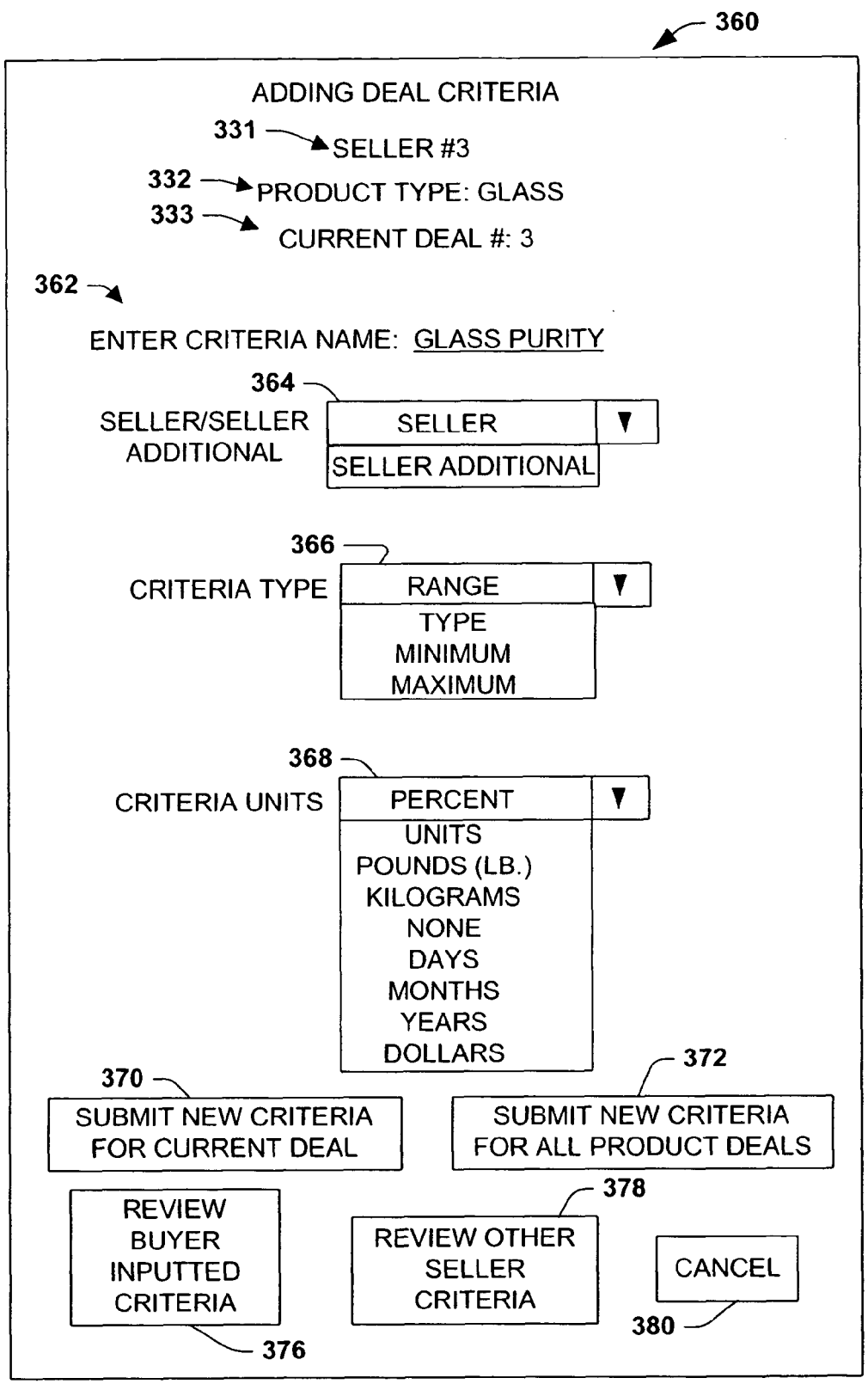
FIG. 8d illustrates a input screen for adding buying and selling criteria to the deal in accordance with an aspect of the present invention.

Referring now to FIG. 8d, the "Adding Deal Criteria" input screen 360 will be described. The seller number 331, the product type 332 and the current deal number 333 are automatically generated at the top of input screen 360. The seller 20 can enter a criteria name in the "Enter Criteria Name" box 362. The seller can then choose whether the criteria is a seller type or a seller additional criteria type from a first scroll down menu 364. The seller 20 choose a criteria type from a second scroll down menu 366 and the criteria units in a third scroll down menu 368. The seller can submit this new criteria for the current deal by clicking on the "Submit New Criteria for Current Deal" button 370 or add the new criteria for all the product deals by clicking on the "Submit New Criteria for All Product Deals" button 372. The seller 20 may at any time review the buyer inputted criteria submitted by the buyer 15 that is not in any of the seller's deals by clicking on the "Review Buyer Inputted Criteria" button 376. The seller 20 can review this list to determine whether or not the seller 20 would like to add this criteria to the present deal or all deals to ensure that they are in accord with buyer needs. The seller 20 may also review the criteria that are offered by other sellers, but not the current seller, by clicking on a "Review Other Seller Criteria" button 378. This will help the seller keep current on what the other seller's selling criteria are being utilized for matching to the buyer's buying criteria to satisfy the current market demands.

If the seller would like to return to the "Create or Modify Deal" screen 275 the seller 20 can click on the "Cancel" button at any time. Furthermore, if the seller 20 simply desires to re-perform the search, the seller 20 at any time is able to return back to a previous screen selecting the "back" function available using an Internet browser such as, for example, Microsoft Internet Explorer™, Netscape™, etc. Additionally, a hyperlink to various screens, such as the search screen, preferably is provided on each web page.

Figure 9:
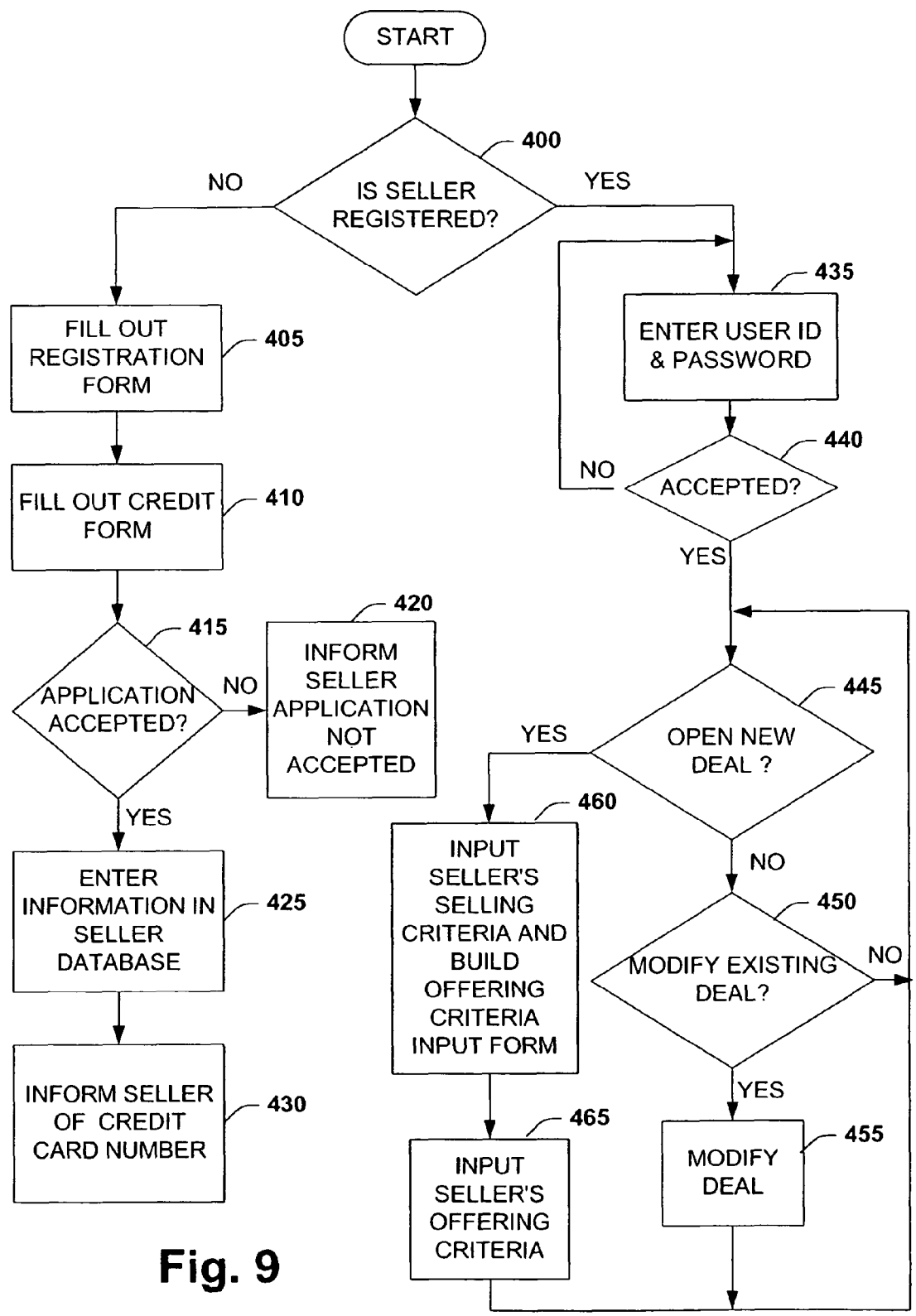
FIG. 9 illustrates a flow chart for a seller desiring to conduct business electronically in accordance with an aspect of the present invention.

Proceeding now to FIG. 9, the operations of the processor 100 of the central server 25 in handling sellers 20 is depicted. In particular, the processor 100 in step 400 initially determines whether a seller 20 is registered or not based on which hyperlink 130, 140 (FIG. 3) the seller 20 selects. If the seller 20 selects hyperlink 140 indicating the seller is not registered, the processor 100 proceeds to step 405. In step 405, the processor 100 provides the seller 20 with a seller's registration form 408 (FIG. 10) to fill out. The registration form 408 is similar to the registration form 208 for the buyer 20 and allows the seller 20 to select a preferred user ID and password. Once completed, the processor 100 proceeds to step 410 where the seller 20 is requested to submit a credit card application so that all costs and fees associated with conducting business may be directly billed to the seller's credit card. As discussed above, the credit card approval process may occur by a third party vendor accessible via a hyperlink.

Figure 11:
FIG. 11 illustrates a seller database stored in the central server in accordance with an aspect of the present invention.

Once the credit card application is submitted by the seller 20, the processor 100 proceeds to step 415 where the processor 100 determines if the credit card application has been approved. If the credit card application has not been approved, the processor 100 proceeds to step 420 where the seller 20 is informed that their credit card application has not been approved and the seller 20 is provided with a customer service telephone number so that the seller 20 may optionally set up the account in a different fashion. If, however, in step 415 the credit card application is accepted, the processor 100 proceeds to step 425 where the seller information is stored in a seller database 427 (FIG. 11). Finally, in step 430, the processor 100 is configured to provide the seller 20 with the newly issued credit card number so that the seller 20 is able to open deals. Further, the processor 100 is configured to provide a report to a system administrator who then mails a confirmation copy of the seller's information stored in the seller's database to the seller 20. This completes the seller's registration process.

Continuing to refer to FIG. 9, if in step 400 a seller has already registered, the seller 20 may login as a registered user by selecting the registered user hyperlink 130 (FIG. 3). Once selected, the processor 100, in step 435 prompts the seller 20 to enter their user ID and password. Upon input of the user ID and password, the processor 100 proceeds to step 440 where the processor 100 verifies a valid user ID and password have been entered by comparison with the information stored in the seller database 427 (FIG. 11). If the user ID and password entered by the seller 20 does not match any entry in the seller database 427, the processor 100 in step 440 returns to step 435 for re-entry of such information. If, however, in step 440, a valid user ID and password are entered, the processor 100 proceeds to step 445.

Upon successful entry of a user ID and password, the seller 20 is provided with a seller option screen 275 as shown in FIG. 8a. For example, the seller 20 may decide to open a new deal 182 or the seller 20 may decide to view a current deal 182 for one of a number of goods or services offered by the seller 20 or review a list of buyer inputted criteria. Accordingly, if in step 445, the processor 100 determines that the seller 20 desires to open new deal 182 for a selected product, the processor 100 proceeds to step 460.

In step 460, the processor 100 requests that the seller 20 enter the seller's selling criteria, so that the system can build a seller's product offering criteria input screen, in step 465. For example, in the present aspect the product agreed upon seller criteria is the volume range of the order and the price per pound of the order, the seller's selling criteria includes the delivery time and warranty with quality to be added next, and the seller additional criteria is that the buyer pay the cost of shipping the goods. As discussed above, the processor 100 utilizes the information input from the seller 20 to display a seller's product ordering input form 330.

In step 465, the processor 100 request that the seller enter the limits associated with the seller's selling criteria chosen in step 460, and the list of buyer's entitled to be offered the present deal. The information is entered and submitted to form a deal. The processor 100 uses this information to match buying and ordering criteria of the buyer with selling and offering criteria of the seller, so that deals can be completed in an expedited manner.

Continuing to refer to FIG. 9, if in step 445, the seller 20 has not selected to open a new deal, the processor 100 determines in step 450 whether the seller 20 has decided to modify an existing deal 182. In the present aspect of the invention, the seller 20 is limited to modify those deals which they have opened. Accordingly, if the processor 100 determines that the seller does desire to modify a deal 182, the processor 100 provides the seller 20 with a list of deals 180 which the seller has opened. Upon selection of one of the deals 182, the processor 100 proceeds to step 455 where the deal 182 is displayed to the seller 20. If a deal 182 is not entered in step 450, or following steps 455 and 460, the processor 100 returns to step 445.

Figure 12:
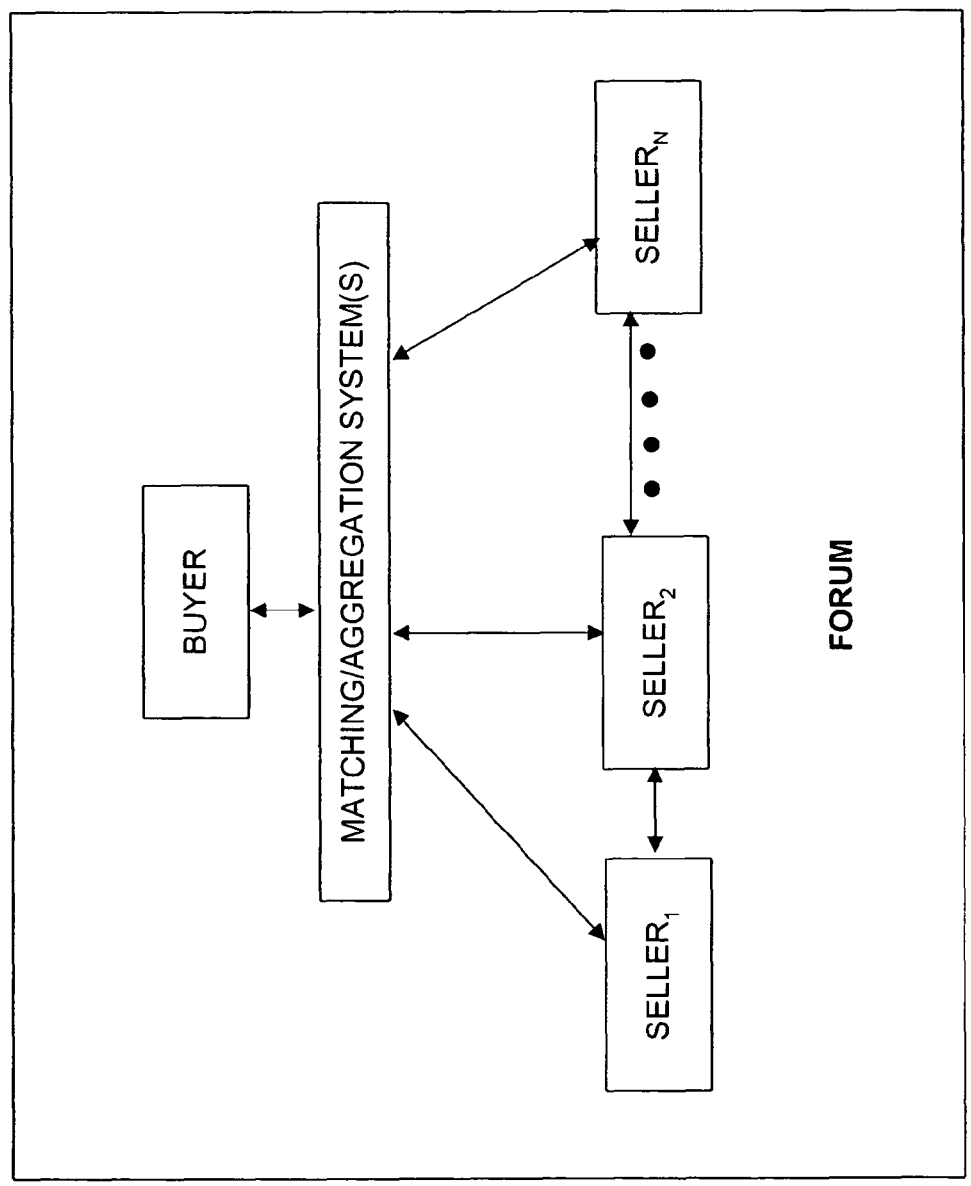
FIG. 12 is a schematic illustration of an electronic forum for conducting a buyer sponsored business transaction in accordance with an aspect of the present invention.
Figure 14:
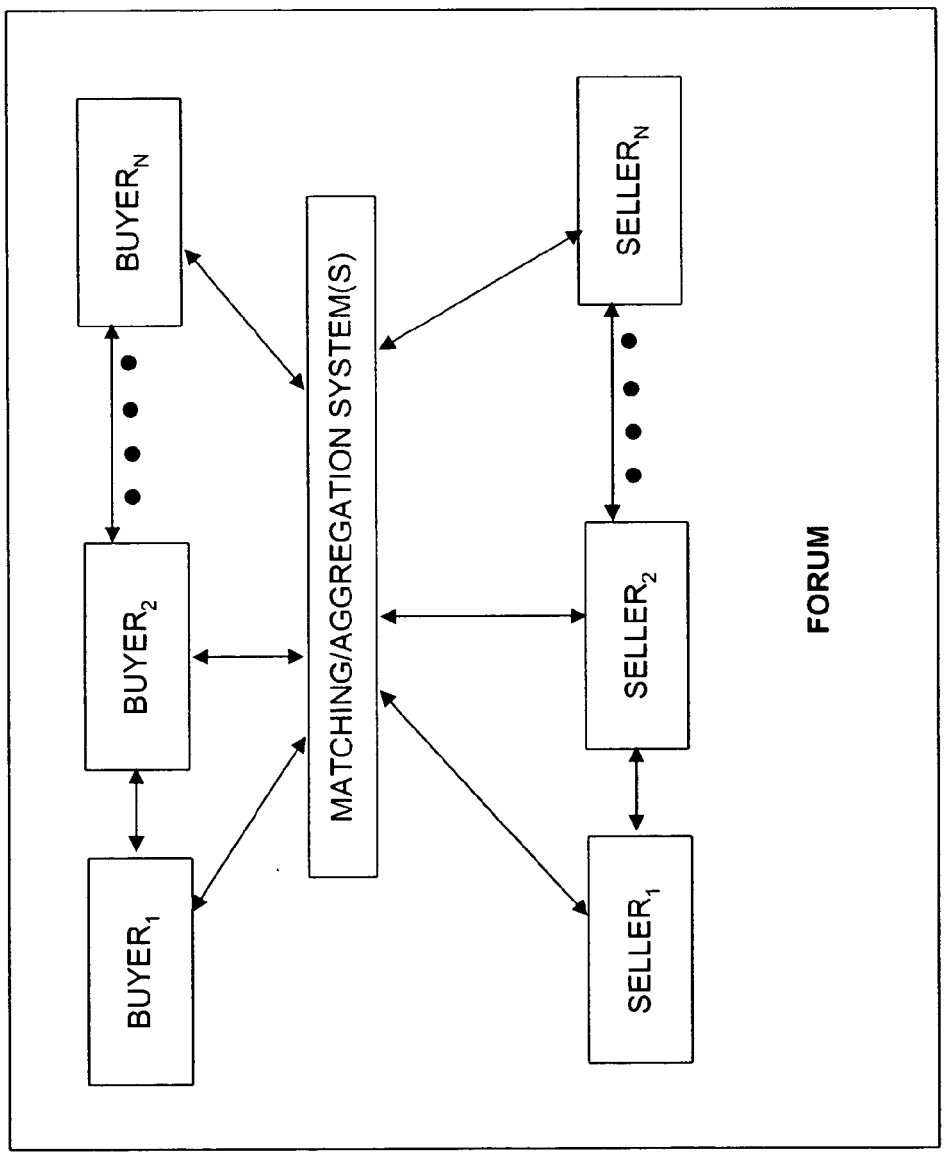
FIG. 14 is a schematic illustration of an electronic forum for conducting a buyer and seller co-sponsored business transaction in accordance with an aspect of the present invention.

Regarding FIG. 12, although the present invention has been largely described within the context of a seller sponsored deal room, it is to be appreciated that a buyer or buyers may sponsor a deal room to aggregate purchasing goods/services from a plurality of sellers. For example, a buyer can license a DealRoom and requests that suppliers respond to an online offer. With a pre-approved name and password (e.g., from the registration page completed by the supplier), the supplier can see the offer with offer details and/or a specification. The supplier can choose to agree to accept terms of the specification; alternatively, the supplier can make a change to the offer and submit such changes for the buyer's review.

Referring briefly to FIG. 13, an exemplary bid form 500 is illustrated. Exemplary bid form 500 contains price schedule 502 for specifying volume price points, details section 504 for indicating specific details of the offer, remarks section 506 for submitting changes to bid for a buyer to review, and buttons 508 for, inter alia, modifying prices, initiating display of the current low bids, and submitting a bid to the buyer. Thus, for example, a supplier can be asked to complete an online bid 500 for a set volume of widgets. Supplier A sees a form such as bid form 500 that includes details 504 of the offer (e.g. ship date, range, time period of offer, minimum volume quantity, total quantity available, volume reached on last offer, volume of last x number of offers, average for this product over the past x number of offers) and price points 502 for the supplier to complete. As an illustration of this example:

A buyer requests a supplier to complete an online bid for the following price schedule or curve (as shown in FIG. 13):
Up to 100,000 widgets
100,001 to 300,000 widgets
301,000 to 500,000 widgets
500,001 to 1,000,000 widgets
Supplier A completes price information as follows:
Up to 100,000 widgets: $5.50 per widget
100,001 to 300,000 widgets: $4.50 per widget
301,000 to 500,000 widgets: $4.00 per widget
500,001 to 1,000,000 widgets: $3.75 per widget The supplier then submits the price information to the requesting buyer (e.g., by clicking a submit button). According to one aspect of the present invention, the supplier may be able to see other bids submitted by other companies. The bids can be shown in a variety of formats including: by supplier's name, by lowest price to highest price, by price curves (both individual and in comparison to one another), by the lowest priced supplier at each price point, etc. The curve can also be shown in "the lowest price at each price point" and indicate the supplier as well for each price level, as illustrated below:
Up to 100,000 widgets: $5.00 per widget—Supplier B
100,001 to 300,000 widgets: $4.25 per widget—Supplier B
301,000 to 500,000 widgets: $4.00 per widget—Supplier A
500,001 to 1,000,000 widgets: $3.65 per widget—Supplier D Furthermore, it should be noted that buyers can define a period of time for receiving all bids from suppliers.

A price curve can be displayed online such that information received from the suppliers can be viewed in real time. The supplier can quickly modify these prices by clicking on a "modify price" for each of the price tiers. Additionally, it should be noted that a bid can be marked as a "lowest price wins" bid or "price is but one component of the bid" as determined by the buyer. This type of bid marking facilitates a pricing strategy determination by the supplier.

Submitting bids can be performed in a variety of ways. For example, a period of time can be posted in which changes will be accepted. The price curve changes in real time; however, upon expiration of the time period the price curve can become fixed. The supplier can view the suppliers that have "won" at the end of the time period and/or have presented a lowest price for a corresponding price point. As another example, a buyer can define a time in which the suppliers must have their final bids submitted. Subsequently, when the bids are received by the buyer, the bids automatically populate according to a lowest price at each price point. Price curves can then be posted to a website for participating suppliers to view the final bids received.

Additionally, the system can include a resubmit price curve feature. The resubmit feature allows a supplier to automatically replenish a current price curve with a previously submitted price curve. The system can also include a matching feature. The matching feature allows a supplier to match a winning price curve from a previous bidding session.

A buyer, authorized to access an order (e.g., with a username and password), can view a current price curve and place an order for a volume of widgets listed. The buyer can view which supplier is associated with each price point. For example, the buyer can move a cursor over the price point and see the supplier with the lowest price at this point. Alternatively, the buyer can view a list all suppliers that have submitted price curves and can sort the list by the lowest price bids. Accordingly, the buyer does not have to select the supplier that submitted the lowest bid. Instead, the buyer can set parameters or rules within selection software based on a differential between a first supplier and a second supplier. For instance, if the first supplier is within 15% of lowest price, the first supplier should be given the "price slot" for that part of the curve and/or a supplier that won the last round for the price curve will be a default supplier if the next price given is not more than 5% more than the current supplier's price curve. The parameters/rules can be published for the supplier to review prior to accepting to bid.

The buyer can also determine a product ship date. For example, the offer can have the following selections:

Single date: October $5^{th}$

Multiple ship dates: October $5^{th}$, November $5^{th}$, December $5^{th}$

Range of dates: October 1 thru October $8^{th}$

Additionally, the buyer can review the offer and, after placing an order, make a change to the ship date and enter new volumes for each ship date. Although, changes can be limited to a defined time period established by the buyer and agreed to by the supplier.

Furthermore, as volume is ordered and the ship dates are selected, the price curve can be set to dynamically change to reflect a current state of the order. As more volume is ordered, the price continues to drop. As an example:

Each buyer is able to place his/her order and then select from the ship dates shown:

20,000 widgets ordered

Current price point:

The ship dates are shown:

October $8^{th}$: 10,000 widgets

November $8^{th}$: 5,000 widgets

December $8^{th}$: 5,000 widgets

Flexibility can be built into the delivery schedule as well based on requirements of the buyer. Additionally, buyers can later add to the order (e.g., by selecting an icon). Any additional product ordered during this period falls under the last price point achieved. As an alternative, if the price point reached during an offer was supplier A, and the volume continues to increase after the order, the price can adjust in accordance with the original price curve.

The multiple supplier demand aggregation system can also include a "running" demand aggregation scenario. This scenario includes a predetermined time for an open order period (e.g., six months). If there is a supplier within a lowest price tier, then the supplier agrees to a predetermined number of ship dates (e.g., one per month) and is considered the current supplier for the order or the incumbent. As more products are ordered during the set time period, the price can continue to decrease. Then, at the end of the time period, a final price is determined, an average price paid is shown, and if the average price paid is higher than the final price shown on the curve, system software calculates an amount the supplier owes the buyer. For example, if 500,000 pieces are ordered with a price shown of $3.50 per piece and the average price paid during the period was $4.00 per piece, then the software calculates the amount per piece and the total number of pieces purchased and submits the rebate amount to the supplier as well as to the buyer.

Additionally, the rebate can be determined during the order based on a current price curve. For instance, if the first price was $5.00 per piece and the volume ordered decreases the price to the next tier or to $4.50, then the buyer would submit a request for a rebate for the amount paid at $5.00 and once received, begin paying the lower price moving forward.

The system can also include a real time rebate curve. For example, buyers purchase enough volume to reach a second price tier. If the first price tier is $5.00 per piece and the second price tier is $4.50 per piece after 50,000 were ordered, the buyer would be entitled to a difference of 50,000.times.0.50 or $25,000. The software would calculate this and either inform the supplier of the deficit of the rebate, or the software could calculate the next price tier to achieve.

A variety of options also exist to parcel out the rebate including but not limited to: Not charging product fees until the rebate amount, or amount owed, is recovered. The original companies that ordered would receive their commensurate rebate amount based on a percentage of products they ordered out of the total products ordered. This figure would also be saved on their online records. They could have a credit for future purchases or be refunded the rebate to their online accounts. A reduced fee with a predetermined price floor (e.g., $2.00 per piece) is established and agreed to by the buyer and/or supplier until the rebate amount is recouped from the volume. A period of time could be established to make up the difference. Then, the buyers and supplier would be notified and a second price ($4.50 in the example above) would be established at that new price point. This process of options may continue throughout the downward slope of the price curve as more volume is ordered.

Regarding FIG. 13, although the present invention has been largely described within the context of a seller sponsored deal room/transaction, it is to be appreciated that buyers and sellers may concurrently sponsor a deal room/transaction to aggregate selling of and purchasing of goods/services by a plurality of sellers and buyers respectively. For example, a multiple sellers and buyers may employ the present invention to create a deal room/transaction forum where a plurality of sellers and buyers may assemble to aggregate selling and buying of specific goods and/or services that the sellers which to sell and the buyers desire to purchase. Such a transaction forum creates great efficiencies with respect to purchase price and/or selling quantity of particular goods/services. For example, in such a forum dedicated to the selling and purchasing of a specific product/service, sellers can assemble to compete for the sale of their respective product/service which leads to pricing efficiencies. Buyers can assemble in such a forum to aggregate buying power in order to negotiate good prices and close deals. Sellers on the other hand may also aggregate to meet the needs of a large buying block.

The subject specification describes exemplary systems and interfaces for implementing the subject invention, and therefore further discussion thereto is omitted for sake of brevity. However, it is to be appreciated that one skilled in the art based on the above discussion regarding seller sponsored deal rooms/transactions could apply such teachings to implement the aforementioned buyer sponsored deal room/transaction.

The present invention may be implemented via object oriented programming techniques. In this case each component of the system, could be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors which the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

The present invention can employ abstract classes, which are designs of sets of objects that collaborate to carry out a set of responsibilities. Frameworks are essentially groups of interconnected objects and classes that provide a prefabricated structure for a working application. It should also be appreciated that the PCM and the shared memory components could be implemented utilizing hardware and/or software, and all such variations are intended to fall within the appended claims included herein.

According to an exemplary aspect of the present invention, Java and CORBA (Common Object Request Broker Architecture) are employed to carry out the present invention. Java is an object-oriented, distributed, secure, architecture neutral language. Java provides for object-oriented design which facilitates the clean definition of interfaces and makes it possible to provide reusable "software ICs." Java has an extensive library of routines for copying easily with TCP/IP protocols like HTTP and FTP. Java applications can open and access objects across a network via URLs with the same ease to which programmers are accustomed to accessing a local file system.

Furthermore, Java utilizes "references" in place of a pointer model and so eliminates the possibility of overwriting memory and corrupting data. Instead of pointer arithmetic that is employed in many conventional systems, the Java "virtual machine" mediates access to Java objects (attributes and methods) in a type-safe way. In addition, it is not possible to turn an arbitrary integer into a reference by casting (as would be the case in C and C++ programs). In so doing, Java enables the construction of virus-free, tamper-free systems. The changes to the semantics of references make it virtually impossible for applications to forge access to data structures or to access private data in objects that they do not have access to. As a result, most activities of viruses are precluded from corrupting a Java system.

Java affords for the support of applications on networks. Networks are composed of a variety of systems with a variety of CPU and operating system architectures. To enable a Java application to execute anywhere on the network, a compiler generates an architecture neutral object file format—the compiled code is executable on many processors, given the presence of the Java runtime system. Thus, Java is useful not only for networks but also for single system software distribution. In the present personal computer market, application writers have to produce versions of their applications that are compatible with the IBM PC and with the Apple Macintosh. However, with Java, the same version of the application runs on all platforms. The Java compiler accomplishes this by generating byte code instructions which have nothing to do with a particular computer architecture. Rather, they are designed to be both easy to interpret on any machine and easily translated into native machine code on the fly.

Being architecture neutral, the "implementation dependent" aspects of the system are reduced or eliminated. The Java virtual machine (VM) can execute Java byte codes directly on any machine to which the VM has been ported. Since linking is a more incremental and lightweight process, the development process can be much more rapid and exploratory. As part of the byte code stream, more compile-time information is carried over and available at runtime.

Thus, the use of Java in the present invention provides a server to send programs over the network as easily as traditional servers send data. These programs can display and manipulate data on a client computer. The present invention through the use of Java supports execution on multiple platforms. That is the same programs can be run on substantially all computers—the same Java program can work on a Macintosh, a Windows 95 machine, a Sun workstation, etc. To effect such multi-platform support, a network interface 105 and a network browser (not shown) such as Netscape Navigator™ or Microsoft Internet Explorer™ may be used in at least one aspect of the present invention. It should be appreciated, however, that a Java stand-alone application may be constructed to achieve a substantially equivalent result. Although the present invention is described with respect to employing Java, it will be appreciated that any suitable programming language or programming environment may be employed to carry out the present invention.

An Internet explorer (e.g., Netscape™, Microsoft Internet Explorer™) is held within the memory of the client computer. The Internet explorer enables a user to explore the Internet and view documents from the Internet. The Internet explorer may include client programs for protocol handlers for different Internet protocols (e.g., HTTP, FTP and Gopher) to facilitate browsing using different protocols.

It is to be appreciated that any programming methodology and/or computer architecture suitable for carrying out the present invention may be employed and are intended to fall within the scope of the hereto appended claims.

Furthermore, while the invention has been described supra in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices, microprocessor-based or programmable consumer electronics, and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A non-transitory computer readable storage medium stored on a hand-held computing device, the medium having embodied thereon instructions executable by a processor to:
   receive through an input of the hand-held device a first request to receive a plurality of offers for purchase of a product or service, the request including a selection of pre-determined criteria associated with the good or service, the pre-determined criteria being established and presented by a third party;
   receive information for a plurality of offers related to the first request, the plurality of offers including at least one discounted price with a price per unit for the product or service, a quantity associated with the discounted price, and a time period associated with the delivery of the good or service;
   permit the buyer to alter the time period after the purchase;
   provide a supplier of the good or service with an indication that the delivery time has been altered by the buyer; and
   display a listing of the received plurality of offers.

2. The non-transitory computer readable storage medium of claim 1, the instructions further executable to transmit the first request to a server.

3. The non-transitory computer readable storage medium of claim 2, wherein the information is received from the server in response to the first request.

4. The non-transitory computer readable storage medium of claim 1, wherein the first request includes a search request.

5. The non-transitory computer readable storage medium of claim 1, wherein the information is associated with one or more updated offers.

6. The non-transitory computer readable storage medium of claim 5, wherein the information is updated in real-time.

7. The non-transitory computer readable storage medium of claim 2, the instructions further executable to transmit the second request to a server in communication with computing devices associated with the plurality of merchants.

8. The non-transitory computer readable storage medium of claim 1, wherein the altering of the time period associated with the delivery of the good or service includes the ability to select a different time period from a list of options.

9. The non-transitory computer readable storage medium of claim 8, wherein the ability to select a different time period includes an option to add a quantity to the initial order.

10. The non-transitory computer readable storage medium of claim 1, wherein the altering of the time period associated with the delivery of the good or service includes the ability to select an additional time period.

11. The non-transitory computer readable storage medium of claim 10, wherein an additional time period includes a quantity and a recurring delivery schedule.

12. The non-transitory computer readable storage medium of claim 11, wherein the delivery schedule is expressed in days, weeks, or months.

13. The non-transitory computer readable storage medium of claim 11, wherein at least one of the quantity or recurring delivery schedule can be changed by the buyer at a later time to alter future deliveries.

14. The non-transitory computer readable storage medium of claim 1, wherein the purchase is made by way of credit card information associated with the buyer and stored in an online account.

15. The non-transitory computer readable storage medium of claim 1, wherein the altering of the time period associated with the delivery of the good or service includes an option to select a quantity and a recurring delivery time period.

16. The non-transitory computer readable storage medium of claim 15, wherein the time period is expressed in days, weeks, or months.

17. The non-transitory computer readable storage medium of claim 15, wherein the option selected by a buyer is stored to an online account associated with the buyer and allows the buyer to receive at least one of a price discount, credit, or rebate.

18. The non-transitory computer readable storage medium of claim 1, wherein the selectable criteria includes a category and a feature associated with the category.

19. The non-transitory computer readable storage medium of claim 1, wherein the selectable criteria includes information related to the reputation of at least one seller.

20. A system for facilitating a buyer-initiated feature within a business transaction, the system comprising:
   a processor;
   a memory;
   one or more software modules stored in the memory and executable by the processor to:
      receive through an input of a hand-held device a first request to receive a plurality of offers for purchase of a product or service, the request including a selection of pre-determined criteria associated with the good or service, the pre-determined criteria being established and presented by a third party;
      receive information for a plurality of offers related to the first request, the plurality of offers including at least one discounted price with a price per unit for the product or service, a quantity associated with the discounted price, and a time period associated with the delivery of the good or service;
      permit the buyer to alter the time period after the purchase;
      provide a supplier of the good or service with an indication that the delivery time has been altered by the buyer; and
      display a listing of the received plurality of offers.

21. The system of claim 20, wherein the first request includes a search request.

22. The system of claim 20, the instructions further executable to transmit the second request to a server in communication with computing devices associated with the plurality of merchants.

23. The system of claim 20, wherein the altering of the time period associated with the delivery of the good or service includes the ability to select a different time period from a list of options.

24. The system of claim 23, wherein the ability to select a different time period includes an option to add a quantity to the initial order.

25. The system of claim 20, wherein the altering of the time period associated with the delivery of the good or service includes the ability to select an additional time period.

26. The system of claim 25, wherein an additional time period includes a quantity and a recurring delivery schedule.

27. The system of claim 26, wherein the delivery schedule is expressed in days, weeks, or months.

28. The system of claim 26, wherein at least one of the quantity or recurring delivery schedule can be changed by the buyer at a later time to alter future deliveries.

29. The system of claim 20, wherein the altering of the time period associated with the delivery of the good or service includes an option to select a quantity and a recurring delivery time period.

30. The system of claim 29, wherein the time period is expressed in days, weeks, or months.

31. The system of claim 29, wherein the option selected by a buyer is stored to an online account associated with the buyer and allows the buyer to receive at least one of a price discount, credit, or rebate.

32. The system of claim 20, wherein the selectable criteria includes a category and a feature associated with the category.

* * * * *